United States Patent
Chen

(10) Patent No.: US 11,588,583 B2
(45) Date of Patent: Feb. 21, 2023

(54) METHOD AND DEVICE FOR CONFIGURING HARQ FEEDBACK BETWEEN TERMINAL NODES

(71) Applicant: DATANG MOBILE COMMUNICATIONS EQUIPMENT CO., LTD., Beijing (CN)

(72) Inventor: Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/421,385

(22) PCT Filed: Dec. 18, 2019

(86) PCT No.: PCT/CN2019/126353
§ 371 (c)(1),
(2) Date: Jul. 8, 2021

(87) PCT Pub. No.: WO2020/143417
PCT Pub. Date: Jul. 16, 2020

(65) Prior Publication Data
US 2022/0045800 A1 Feb. 10, 2022

(30) Foreign Application Priority Data
Jan. 9, 2019 (CN) .......................... 201910018665.8

(51) Int. Cl.
*H04L 1/1812* (2023.01)
*H04W 4/40* (2018.01)
*H04W 92/18* (2009.01)

(52) U.S. Cl.
CPC ............. *H04L 1/1812* (2013.01); *H04W 4/40* (2018.02); *H04W 92/18* (2013.01)

(58) Field of Classification Search
CPC combination set(s) only.
See application file for complete search history.

(56) References Cited

U.S. PATENT DOCUMENTS

2018/0049220 A1* 2/2018 Patil ................. H04W 72/1247
2018/0139774 A1* 5/2018 Ma ........................ H04L 1/1896
(Continued)

FOREIGN PATENT DOCUMENTS

| CN | 107483164 A | 12/2017 |
| CN | 108401480 A | 8/2018 |

(Continued)

OTHER PUBLICATIONS

Sharp, "Discussion on HARQ feedback and CSI acquisition in NR Sidelink", 3GPP TSG RAN WG1 Meeting #95, Spokane, USA, Nov. 12-16, 2018, total 3 pages, R1-1813210.
(Continued)

*Primary Examiner* — Hanh N Nguyen
(74) *Attorney, Agent, or Firm* — Kilpatrick Townsend & Stockton, LLP

(57) ABSTRACT

The embodiments of the present application relate to a method and device for configuring hybrid automatic repeat request (HARQ) feedback between terminal nodes. The method of the embodiments of the present application includes: a base station configuring a HARQ feedback enable rule of a sidelink interface for a terminal; indicating to said terminal the HARQ feedback enable rule of the configured sidelink interface, to enable the terminal to determine, according to the HARQ feedback enable rule of the configured sidelink interface, to enable or not enable HARQ feedback on the sidelink interface.

18 Claims, 7 Drawing Sheets

(56) References Cited

U.S. PATENT DOCUMENTS

| | | | |
|---|---|---|---|
| 2018/0287744 A1 | 10/2018 | Sundararajan et al. | |
| 2019/0342911 A1* | 11/2019 | Talarico | ............ H04W 72/0446 |
| 2021/0377912 A1* | 12/2021 | El Hamss | ............. H04L 1/1819 |

FOREIGN PATENT DOCUMENTS

| | | | |
|---|---|---|---|
| CN | 108923894 | A | 11/2018 |
| CN | 106165510 | B | 1/2020 |
| CN | 110832899 | A | 2/2020 |
| JP | 2017516361 | A | 6/2017 |
| WO | 2018151637 | A1 | 8/2018 |
| WO | 2019004536 | A1 | 1/2019 |
| WO | 2019004688 | A1 | 1/2019 |

OTHER PUBLICATIONS

LG Electronics, "Updated feature lead summary for agenda item 7.2.4.1.2 Physical layer procedures", 3GPP TSG RAN WG1 Meeting#95, Spokane, USA, Nov. 12-16, 2018, total 12 pages, R1-1814265.

Nokia et al., "Consideration on HARQ Impact for NTN", 3GPP TSG RAN WG1 Meeting #93 Busan, Korea, May 21-25, 2018, total 3 pages, R1-1807665.

Ericsson , "Physical layer structures of NR V2X", 3GPP TSG-RAN WG1 Meeting #94bis Chengdu, China, Oct. 8-12, 2018, total 16 pages, R1-1811592.

Zte et al., "Discussion on Uu based resource allocation/configuration for NR V2X", 3GPP TSG RAN WG1 Meeting #95, Spokane, USA, Nov. 12-16, 2018, total 5 pages, R1-1813179.

\* cited by examiner

METHOD AND DEVICE FOR CONFIGURING HARQ FEEDBACK BETWEEN TERMINAL NODES

CROSS-REFERENCE TO RELATED APPLICATIONS

The present application is a US National Stage of International Application No. PCT/CN2019/126353, filed on Dec. 18, 2019, which claims priority to the Chinese Patent Application No. 201910018665.8, filed to the Chinese Patent Office on Jan. 9, 2019, and entitled 'METHOD AND DEVICE FOR CONFIGURING HARQ FEEDBACK BETWEEN TERMINAL NODES', the entire contents of which are incorporated herein by reference.

FIELD

The present application relates to the field of vehicle to everything information exchange V2X, in particular to a method and device for configuring HARQ feedback between terminal nodes.

BACKGROUND

In a network transmission standard new radio vehicle to everything (NR V2X) system, a hybrid automatic repeat request (HARQ) feedback mechanism of a Sidelink interface (also called the PC5 interface in 3GPP) is introduced. The HARQ feedback mechanism is a feedback mechanism in which a receiver saves received data when decoding fails and asks a sender to retransmit the data, the receiver combines the retransmitted data with the previously received data and then decodes them, the number of retransmissions is reduced by the diversity gain, and thus the delay is reduced.

In the NR V2X system, direct communication is allowed between terminals close to each other. The communication mode is shown in FIG. 1A, which mainly includes the following two modes.

One is communication between a network side device and terminals through cellular communication link device to network (D2N) link, or cellular communication interface Uu interfaces.

The other is communication between terminals through a device-to-device (D2D) link between devices, or a Sidelink interface. The communication scenarios of direct communication include the following three types:

1. unicast communication, one-to-one communication between direct communication terminals;

2. multicast communication, a terminal can send the same data to all terminals in a communication group at a time; and 3. broadcast communication, a device can send the same data to all nearby devices at a time.

The resource allocation modes for direct communication include the following two.

1. The resource allocation mode of network side scheduling, the network side device allocates direct link resources to the terminals on the Uu interfaces according to Sidelink buffer state reporting (BSR) reported by the terminals, and the resource allocation mode is called mode 1 in 5G, called mode 3 in long term evolution (LTE), and called NR V2X mode 1 in NR V2X.

2. The allocation mode in which a terminal side autonomously selects resources, the terminals select resources from resources pre-configured for the terminals or a transmission resource pool broadcast by a network-side device to send the direct communication link, and the resource allocation mode is called mode 2 in 5G, called mode 4 in LTE, and called NR V2X mode 2 in NR V2X.

The NR V2X system supports broadcast, multicast, and unicast communications of the terminals on the Sidelink interface. When multicast or unicast communication is adopted, a receiving terminal can send HARQ feedback to a sending terminal so that the sending terminal can perform HARQ retransmission. As shown in FIG. 1B, the HARQ feedback mechanism of the Sidelink interface supports the resource allocation mode of network side scheduling. As shown in FIG. 1C, the HARQ feedback mechanism of the Sidelink interface also supports the allocation mode in which the terminal side autonomously selects resources.

The different terminals that directly communicate in the NR V2X system may be all online terminals, or all offline terminals, or some terminals are online terminals, and some are offline terminals. Where online terminals refer to that the terminals participating in the direct communication are located within the coverage range of the 3rd generation partner project (3GPP) direct communication carrier, the terminals can search for a 3GPP base station, and if necessary, the terminals can be controlled by the 3GPP base station, and the offline terminals refer to that the terminals participating in the direct communication are not within the coverage range of the 3GPP direct communication carrier.

In summary, the HARQ feedback mechanism in the NR V2X system has the following disadvantages:

on one hand, the transmission of HARQ feedback signals occupies the resources of the Sidelink interface, due to the half-duplex nature of the Sidelink interface, the receiving terminal cannot send and receive other signaling or data when sending the HARQ feedback signals; and on the other hand, too frequent HARQ feedback signals may cause interference to the transmission of other terminals.

In the prior art, although the feedback resources of the Sidelink interface are introduced in the NR V2X system, the HARQ feedback mechanism in the NR V2X system has not been improved to overcome the above disadvantages.

SUMMARY

The present application provides a method and device for configuring hybrid automatic repeat request (HARQ) feedback between terminal nodes, which can accurately control whether HARQ feedback is sent on a Sidelink interface, conserve Sidelink interface resources while ensuring the transmission delay and reliability of an NR V2X system, reduce terminal power consumption, and reduce the interference of the Sidelink interface.

In a first aspect, the embodiment of the present application provides a method for configuring hybrid automatic repeat request (HARQ) feedback between terminal nodes, including:

configuring a HARQ feedback enable rule of a Sidelink interface for a terminal; and indicating the HARQ feedback enable rule of the Sidelink interface to the terminal, for determining, according to the configured HARQ feedback enable rule of the Sidelink interface, to enable or not enable HARQ feedback on the Sidelink interface.

In a second aspect, the embodiment of the present application provides a method for determining HARQ feedback configuration by a terminal, including:

receiving a configured HARQ feedback enable rule, indicated by a configuration node, of a Sidelink interface; and determining to enable or not enable HARQ feedback on the Sidelink interface according to the configured HARQ feedback enable rule of the Sidelink interface.

In a third aspect, the embodiment of the present application provides a device for configuring HARQ feedback between terminal nodes, including a processor and a memory.

The processor is configured to read a program in the memory and execute:

configuring a HARQ feedback enable rule of a Sidelink interface for a terminal; and indicating the configured HARQ feedback enable rule of the Sidelink interface to the terminal for determining, according to the configured HARQ feedback enable rule of the Sidelink interface, to enable or not enable HARQ feedback on the Sidelink interface.

In a fourth aspect, the embodiment of the present application provides a terminal for determining HARQ feedback configuration, including a processor and a memory.

The processor is configured to read a program in the memory and execute:

receiving a configured HARQ feedback enable rule, indicated by a configuration node, of a Sidelink interface; and determining to enable or not enable HARQ feedback on the Sidelink interface according to the configured HARQ feedback enable rule of the Sidelink interface.

In a fifth aspect, the embodiment of the present application provides a computer storage medium, having a computer program stored thereon, and the program is executed by a processor to implement any method of the first aspect described above.

In a sixth aspect, the embodiment of the present application provides a computer storage medium, having a computer program stored thereon, and the program is executed by a processor to implement any method of the second aspect described above.

According to a method and device for configuring HARQ feedback between the terminal nodes provided by embodiments of the present application, a HARQ feedback mechanism of a Sidelink interface is introduced on the basis of NR V2X and has the following beneficial effects.

On one hand, whether HARQ feedback is sent on the Sidelink interface or not can be accurately controlled, and Sidelink interface resources are conserved while the transmission delay and reliability of an NR V2X system are ensured; and on the other hand, the terminal power consumption can be reduced, interference caused by too frequent HARQ feedback signals to other terminal transmission can be avoided, and the interference of the Sidelink interface can be reduced.

BRIEF DESCRIPTION OF THE DRAWINGS

In order to illustrate the embodiments of the present application, the drawings used in the description of the embodiments are briefly described below.

DETAILED DESCRIPTION OF THE EMBODIMENTS

In the following, some terms in the embodiments of the present application are explained in order to be better understood.

(1) In the embodiments of the present application, the term "a plurality of" means two or more and the other quantifiers are similar.

(2) "And/Or" describes the relationship of the associated objects, indicating that there may be three relationships, for example, A and/or B, which may indicate: there are three cases of A alone, A and B simultaneously, and B alone. The character "I" generally indicates that the associated objects are in an "or" relationship.

According to the embodiments of the present application, based on a HARQ feedback mechanism of a Sidelink interface is introduced on the basis of NR V2X, the HARQ feedback mechanism in the NR V2X system is improved, on one hand, whether HARQ feedback is sent on the Sidelink interface or not can be accurately controlled, and the Sidelink interface resources are conserved while the transmission delay and the reliability of the NR V2X system are ensured; and on the other hand, the power consumption of terminals can be reduced, interference caused by too frequent HARQ feedback signals to other terminal transmission can be avoided, and the interference of the Sidelink interface can be reduced.

Figure 1A:
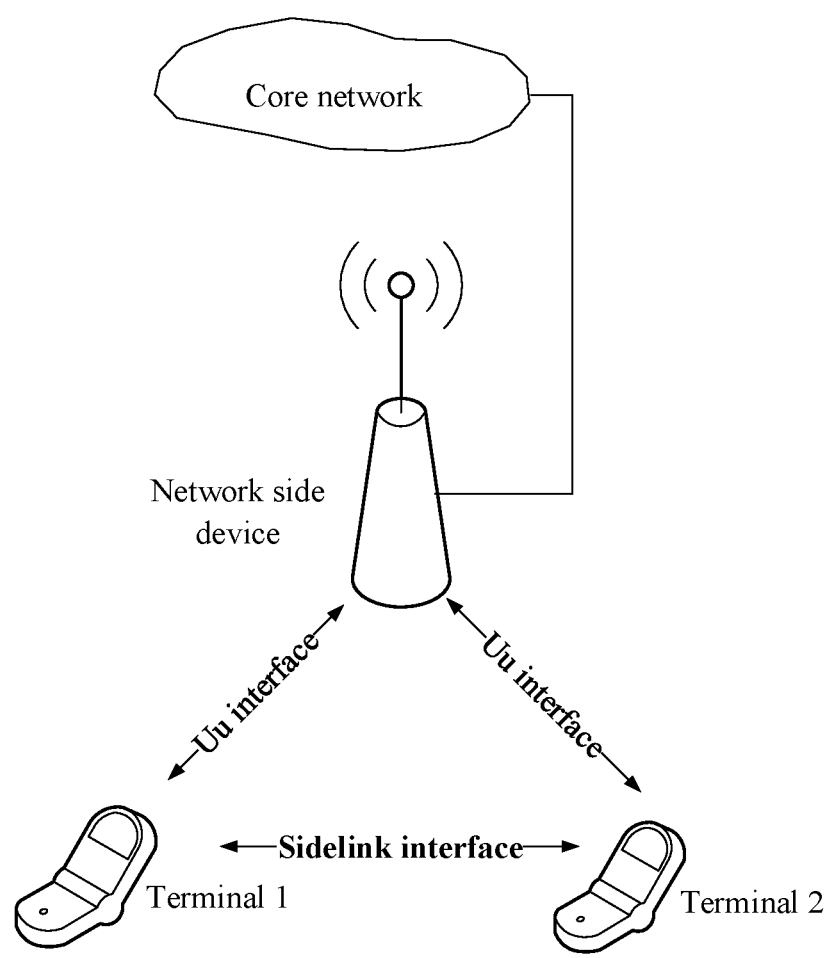
FIG. 1A is a diagram of a direct communication mode of a NR V2X system provided by the present embodiment.
Figure 1B:
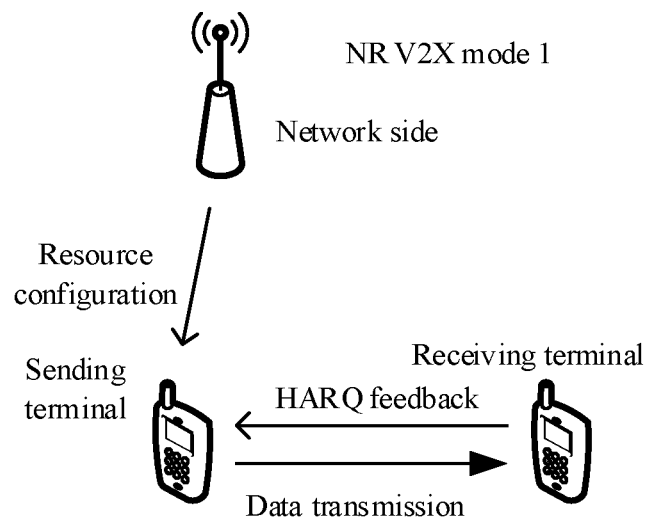
FIG. 1B is a diagram of a resource allocation mode of network side scheduling provided by the present embodiment.
Figure 1C:
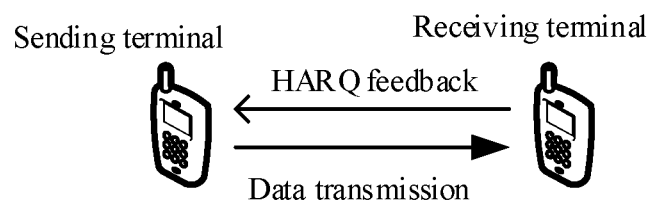
FIG. 1C is a diagram of an allocation mode in which a terminal side autonomously selects resources provided by the present embodiment.

In the embodiments of the present application, the terminals are devices with a wireless communication function, may be deployed on land, like indoor or outdoor, handheld or vehicle-mounted devices; may also be deployed on the water surface (such as ships); and may also be deployed in the air (such as airplanes, balloons, and satellites). The terminals may be a mobile phone, a pad, a computer with a wireless transceiving function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation security, a wireless terminal in a smart city, a wireless terminal in a smart home, etc., and may also be various forms of UE, a mobile station (MS), and terminal devices. The UE in FIG. 1A is a specific example of the terminals of the present application.

In the embodiments of the present application, a "configuration node" or a "node" is a node, and the node may be a base station and is a device for configuring Sidelink interface resources between terminals, and includes but is not limited to: a conventional base station, a relay node relay, a central unit (CU) of a baseband unit, a distributed unit (DU) of the baseband unit, a gNB in 5G, a radio network controller (RNC), a node B (NB), a base station controller (BSC), a base transceiver station (BTS), a home base station (e.g., home evolved node B, or home node B, HNB), a baseband unit (BBU), a transmitting and receiving point (TRP), a transmitting point (TP), a mobile switching center, etc. The base station in the present application may also be a third party terminal configured to schedule Sidelink interface resource transmission between the terminals in the future.

A method and device for configuring HARQ feedback between terminal nodes provided by the embodiments of the present application are based on a HARQ feedback mechanism of a Sidelink interface, where the HARQ feedback mechanism is a feedback mechanism in which a receiving party saves received data in the case of decoding failure and requires a sending party to retransmit the data; the receiving party combines the retransmitted data and the previously received data and then decodes them, the number of retransmissions is reduced through diversity gain, and thus the time delay is reduced.

According to the embodiments of the present application, a HARQ feedback enable rule configured by a configuration node is indicated to terminals based on a typical communication mode of an NR V2X system, where the communication mode is direct communication among devices, and the resource allocation mode of the direct communication includes the following two types:

1. a resource allocation mode of network side scheduling; a network side device allocates direct link resources to the terminals on Uu interfaces according to Sidelink buffer state reporting (BSR) reported by the terminals, and the resource allocation mode is called NR V2X mode 1 in NR V2X; and 2. an allocation mode in which a terminal side autonomously selects resources; the terminals autonomously select resources from resources pre-configured for the terminals or a transmission resource pool broadcast by the network-side device to send a direct communication link, and the resource allocation mode is called NR V2X mode 2 in NR V2X.

The above resource allocation mode for direct communication of the NR V2X system is applied in the embodiments of the present application, and the above-mentioned network side scheduling is the resource allocation mode indicated by the configuration node provided in the present application.

The above-mentioned direct communication devices may all be online or offline, or some devices are on-line and some devices are off-line. The online devices participating in the direct communication are located within the coverage range of a 3GPP direct communication carrier, can search a 3GPP base station and can be controlled by the 3GPP base station if necessary; and the offline devices participating in the direct communication are not within the coverage range of the 3GPP direct communication carrier.

The method for configuring HARQ feedback between the terminal nodes provided by the embodiment of the present application is a method for determining HARQ feedback configuration by a terminal after a network side device such as a base station indicates HARQ feedback configuration. In order to fully describe the method provided by the embodiment from a system aspect, a system in which the base station indicates HARQ feedback configuration and the terminal determines HARQ feedback configuration is taken as an example to concretely illustrate the method, and the system includes a base station 200 and a terminal 201.

Figure 2A:
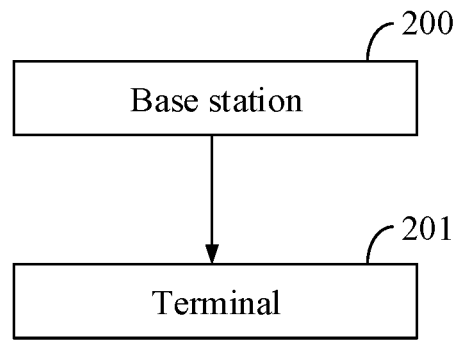
FIG. 2A is a diagram of a system in which a base station indicates HARQ feedback configuration and a terminal determines HARQ feedback configuration.

As shown in FIG. 2A, the base station 200 is configured to:

configure a HARQ feedback enable rule of a Sidelink interface for the terminal, and indicate the configured HARQ feedback enable rule of the Sidelink interface to the terminal.

The terminal 201 is configured to:

receive the configured HARQ feedback enable rule, indicated by the configuration node, of the Sidelink interface, and determine to enable or not enable HARQ feedback on the Sidelink interface according to the configured HARQ feedback enable rule of the Sidelink interface.

In implementations, the base station may be a conventional base station or relay node or CU or DU in a base station unit, or a third party terminal for scheduling Sidelink transmissions between the terminals.

The above base station configures the HARQ feedback enable rule of the Sidelink interface for the terminal, and the terminal determines to enable or not enable HARQ feedback in Sidelink interface transmission according to the HARQ feedback enable rule, configured by the configuration node, of the Sidelink interface.

In implementations, the indication mode that the base station indicates the configured HARQ feedback enable rule of the Sidelink interface to the terminal includes any one of the following modes, and at the same time, the modes that the terminal determines the configured HARQ feedback enable rule of the Sidelink interface according to the indication of the base station are as follows.

Mode 1.

The base station indicates the configured HARQ feedback enable rule of the Sidelink interface to the terminal through a broadcast message for configuring Sidelink interface resources for the terminal; and the terminal determines the indicated configured HARQ feedback enable rule of the Sidelink interface by receiving the broadcast message from the base station for configuring the Sidelink interface resources for the terminal.

In one embodiment, the configured HARQ feedback enable rule of the Sidelink interface is a HARQ feedback enable rule of the Sidelink interface used by the terminal when the terminal uses the configured Sidelink interface resources.

According to the above Mode 1, the transmission mode for the configured HARQ feedback enable rule is applicable to the resource allocation mode indicated by the base station, i.e., NR V2X mode 1, and the allocation mode NR V2X mode 2 in which the terminal side autonomously selects the resources.

Mode 2.

The base station indicates the configured HARQ feedback enable rule of the Sidelink interface to the terminal through dedicated radio resource control (RRC) signaling for configuring Sidelink interface resources for the terminal; and the terminal determines the indicated configured HARQ feedback enable rule of the Sidelink interface by receiving the dedicated RRC signaling for the Sidelink interface resources configured by the base station.

In one embodiment, the base station sends a physical downlink control channel (PDCCH) deactivation command to the terminal to indicate the terminal to not enable the configured HARQ feedback enable rule; and correspondingly, the terminal receives the PDCCH deactivation command sent by the base station and determines to not enable the configured HARQ feedback enable rule.

Or, the base station sends a PDCCH activation command to the terminal to indicate the terminal to enable the configured HARQ feedback enable rule; and correspondingly, the terminal receives the PDCCH activation command sent by the base station and determines to enable the configured HARQ feedback enable rule.

In one embodiment, when the base station allocates the dedicated RRC signaling for the Sidelink interface resources to the terminal, the HARQ feedback enable rule of the Sidelink interface is configured, the HARQ feedback enable rule of the Sidelink interface is not immediately effective after being configured through the dedicated RRC signaling; and the base station sends the PDCCH activation command to enable the configured HARQ feedback enable rule to the terminal at the Uu interfaces, and the base station may also send the PDCCH deactivation command to the terminal to not enable the configured HARQ feedback enable rule. A default state for enabling the HARQ feedback can be preset, the default state can be that the HARQ feedback is sent on the Sidelink interface or the HARQ feedback is not sent on the Sidelink interface, and the default state is defined by a protocol or an initial default state is determined in the RRC configuration signaling.

According to the Mode 2, the transmission mode for the configured HARQ feedback enable rule is applicable to the resource allocation mode, i.e., NR V2X mode 1, indicated by the base station.

Mode 3.

The base station indicates the configured HARQ feedback enable rule of the Sidelink interface to the terminal through a medium access control control element (MAC CE) configured for the terminal; and the terminal determines the indicated configured HARQ feedback enable rule of the Sidelink interface through the MAC CE configured by the base station.

In one embodiment, the base station configures the MAC CE for the terminal and indicates the configured HARQ feedback enable rule of the Sidelink interface to the terminal, and any one of the following methods for configuring the MAC CE may be selected.

(1) The base station indicates the configured HARQ feedback enable rule of the Sidelink interface to the terminal through a logical channel identification (LCID) value in a sub-header in the MAC CE configured for the terminal; and correspondingly, the terminal determines the indicated configured HARQ feedback enable rule of the Sidelink interface through the LCID value in the sub-header in the MAC CE configured by the base station.

(2) The base station indicates the configured HARQ feedback enable rule of the Sidelink interface to the terminal through a specified content in the MAC CE configured for the terminal; and correspondingly, the terminal determines the indicated configured HARQ feedback enable rule of the Sidelink interface through the specified content in the MAC CE configured by the base station.

In one embodiment, the LCID value in the sub-header in the MAC CE configured for the terminal is configured to: indicate to not enable HARQ feedback through a fixed value, or indicate to enable or not enable HARQ feedback through different indication values respectively.

In one embodiment, the LCID value in the sub-header in the MAC CE configured for the terminal is configured to indicate to not enable HARQ feedback; or two LCID values are specified for the MAC CE configured for the terminal, where one value is configured to indicate the terminal to enable HARQ feedback, and the other value is configured to indicate the terminal to not enable HARQ feedback.

In one embodiment, the specified content in the MAC CE configured for the terminal includes any one or more of the following:

(1) a radio bearer (RB) identification of the Sidelink interface for enabling or not enabling HARQ feedback;

(2) a LCID of service data of the Sidelink interface for enabling or not enabling HARQ feedback;

(3) a bitmap for indicating to enable or not enable HARQ feedback for a corresponding RB;

(4) a data quality of service (QoS) threshold for enabling or not enabling HARQ feedback, the QoS threshold may be a 5G QoS identifier (5QI) parameter; or a time delay threshold; or a reliability threshold; or a priority threshold;

(5) a physical layer channel quality threshold parameter for enabling or not enabling HARQ feedback; and (6) a physical layer HARQ retransmission number count threshold for enabling or not enabling HARQ feedback.

According to the Mode 3, the transmission mode for the configured HARQ feedback enable rule is applicable to the resource allocation mode, i.e., NR V2X mode 1, indicated by the base station.

Mode 4.

The base station indicates the configured HARQ feedback enable rule of the Sidelink interface to the terminal through the PDCCH command for configuring the Sidelink interface resources for the terminal; and the terminal determines the indicated configured HARQ feedback enable rule of the Sidelink interface by receiving the PDCCH command of the Sidelink interface resources configured by the base station.

In one embodiment, based on the PDCCH command being a dynamic resource scheduling command or a periodic resource scheduling command, the following two modes for indicating the HARQ feedback enable rule of the Sidelink interface are included and are as follows.

One is that when the PDCCH command is the dynamic resource scheduling command, the configured HARQ feedback enable rule of the Sidelink interface is a HARQ feedback enable rule used by the currently dynamically scheduled Sidelink interface resources; and the other is that when the PDCCH command is the periodic resource scheduling command, the configured HARQ feedback enable rule of the Sidelink interface is a HARQ feedback enable rule used by the periodically scheduled Sidelink interface resources.

According to the Mode 4, the transmission mode for the configured HARQ feedback enable rule is applicable to the resource allocation mode, i.e., NR V2X mode 1, indicated by the base station.

The HARQ feedback enable rule of the Sidelink interface configured by the base station for the terminal of the Sidelink interface includes any one or more of the following rules.

(1) Enabling or not enabling HARQ feedback for the specified Sidelink interface resources, the specified Sidelink interface resources are specified frequency resources, or specified bandwidth part (BWP) resources, or specified carrier resources.

(2) Enabling or not enabling HARQ feedback for terminals in a specified region, it may be a zone indication.

(3) Enabling or not enabling HARQ feedback for a specified bearer, the specified bearer may be denoted as RB identity, and for bearers with low time delay reliability requirements, the bearer may be specified to not enable HARQ feedback.

(4) Enabling or not enabling HARQ feedback for a specified logical channel, when the terminal transmits by using the repeated transmission duplication on the Sidelink interface, the base station may specify part of logical channels in logical channels corresponding to the same bearer to not carry out HARQ feedback.

(5) Enabling or not enabling HARQ feedback for a service bearer which meets set service characteristics, the set service characteristics refer to a combination of one or more of priority parameters such as prose per-packet priority (PPPP) or priority, time delay parameters, reliability parameters such as prose per-packet reliability (PPPR), 5QI or vehicle QoS Identifier (VQI) indications.

(6) Enabling or not enabling HARQ feedback according to the comparison between the channel quality of the Sidelink interface and a set threshold value, when the terminal measures that the channel quality of the Sidelink interface is higher than the set threshold value, HARQ feedback may not be transmitted.

(7) Enabling or not enabling HARQ feedback according to the number of data retransmissions of the Sidelink interface in a set period, when the terminal monitors that the number of HARQ retransmissions is lower than the set threshold within a predetermined statistical time period, the HARQ feedback is not enabled; and corresponding to the mechanism, the base station may be configured with a timer, the HARQ feedback is re-enabled after the timer expires, and the number of HARQ retransmissions is started to be monitored at the same time. The statistical time period length may be specified by the base station configuration or protocol, and the maximum length of the timer may be specified by the protocol.

(8) Enabling or not enabling HARQ feedback according to a scheduling transmission mechanism of the Sidelink interface, when the scheduling transmission mechanism of the Sidelink interface is dynamic scheduling, the base station indicates the terminal to enable or not enable HARQ feedback in the currently dynamic scheduling command; or when the scheduling transmission mechanism of the Sidelink interface is preconfigured resources, the base station indicates the currently activated preconfigured resources to enable or not enable HARQ feedback in a scheduling command for activating the preconfigured resources.

In implementations, a notification of enabling or not enabling HARQ feedback is sent between terminals of the Sidelink interface, as follows:

the peer terminal on the Sidelink interface is notified to enable or not enable HARQ feedback on the Sidelink interface.

In one embodiment, a sending terminal receives the HARQ feedback enable rule indicated by the base station, and after determining to enable or not enable HARQ feedback, the sending terminal may notify a receiving terminal to send/not send HARQ feedback on the Sidelink interface; through the physical layer SCI (serial communication interface) signaling or the RRC signaling of the Sidelink interface; or the receiving terminal directly receives the HARQ feedback enable rule indicated by the base station, and after determining to enable or not enable HARQ feedback, the sending terminal may be notified that HARQ feedback will be sent/not sent subsequently.

Figure 2B:
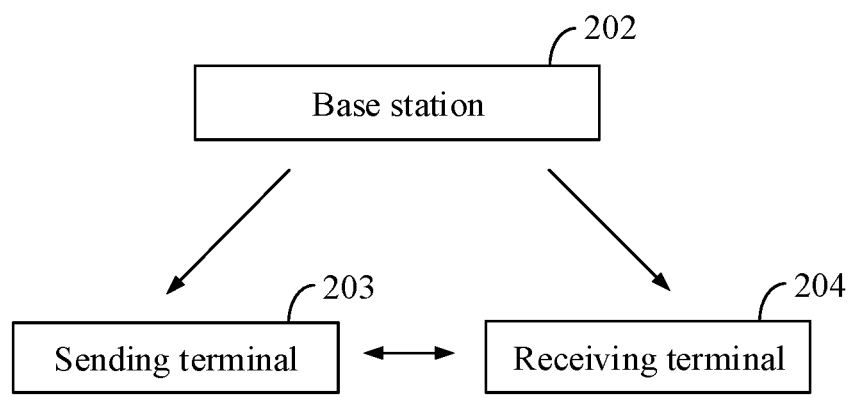
FIG. 2B is a diagram of a system in which a base station indicates a sending terminal/receiving terminal to determine HARQ feedback configuration.

According to the indication mode of the HARQ feedback enable rule configured for the terminal by the base station and the specific rule of using the HARQ feedback enabling, the process of indicating the HARQ feedback enable rule by the base station and determining and executing the HARQ feedback enable rule by the terminal in the above-mentioned system is described in cases. The terminals are distinguished according to the sending terminal and the receiving terminal for clearer explanation, the sending terminal is a terminal for sending Sidelink interface data, the receiving terminal is a terminal for sending Sidelink interface HARQ feedback, and as shown in FIG. 2B, the system includes a base station side 202, a sending terminal 203, and a receiving terminal 204.

Case 1: the base station indicates the configured HARQ feedback enable rule of the Sidelink interface to the terminal through the broadcast message for configuring the Sidelink interface resources for the terminal, where the rule is an absolute use rule.

The base station side 202:

sending Sidelink resource allocation information in the broadcast message for configuring the Sidelink interface resources for the terminal, where the resource allocation information may aim at the online terminal or the offline terminal and may be a conventionally used sidelink interface resource or a specific exceptional resource.

In one embodiment, when allocating the Sidelink interface resources, the base station indicates the HARQ feedback enable rule corresponding to the Sidelink interface resources configured for the terminal, and the HARQ feedback enable rule may be implemented aiming at any one or more of the following.

Rule 1, enabling or not enabling HARQ feedback for the specified sidelink interface resources; where the specified sidelink interface resources may be all or part of currently configured sidelink interface resources.

Rule 2, enabling or not enabling HARQ feedback for the specified region, a zone indication.

The sending terminal 203:

receiving the sidelink interface resources in the sidelink interface resource broadcast message configured by the base station for the sending terminal, determining whether the sidelink interface resources configured in the broadcast message enable HARQ feedback, and determining that HARQ feedback is not received after sidelink data are sent on the sidelink interface resources which do not enable HARQ feedback.

The receiving terminal 204.

According to the mode for determining the sidelink resource by the receiving terminal, the processing methods include any one of the following.

Method 1: the sidelink interface resources in the sidelink interface resource broadcast message configured by the base station for the receiving terminal are received, the received configured sidelink interface resources are determined, configuration of whether the base station enables HARQ feedback for the sidelink interface resources is received simultaneously, and when determining that HARQ feedback is not enabled, after the sidelink data are received on the sidelink interface resources which do not enable HARQ feedback, HARQ feedback is not sent.

Method 2: the transmission resource indication sent by the sending terminal on the Sidelink interface is received, and whether HARQ feedback is needed for transmission on the resource is indicated simultaneously. After the sidelink transmission is received on the resource which does not enable HARQ feedback, HARQ feedback is not sent.

Case 2: the base station indicates the configured HARQ feedback enable rule of the Sidelink interface to the terminal through the broadcast message for configuring the Sidelink interface resources for the terminal, where the rule is a relative use rule.

The base station side 202:

sending the sidelink resource allocation information in the broadcast message for configuring the Sidelink interface resources for the terminal, where the resource allocation information may aim at the online terminal or the offline terminal and may be the conventionally used sidelink interface resource or the specific exceptional resource.

In one embodiment, when allocating the Sidelink interface resources, the base station indicates the HARQ feedback enable rule corresponding to the Sidelink interface resources configured for the terminal, and the HARQ feedback enable rule may be implemented aiming at any one or more of the following.

Rule 1, enabling or not enabling HARQ feedback for the specified bearer.

Rule 2, enabling or not enabling HARQ feedback for the specified logical channel.

Rule 3, enabling or not enabling HARQ feedback for the service bearer which meets the set service characteristics.

Rule 4, enabling or not enabling HARQ feedback according to the comparison between the channel quality of the Sidelink interface and the set threshold value.

Rule 5, enabling or not enabling HARQ feedback according to the number of data retransmissions of the Sidelink interface in the set period.

The sending terminal 203.

The sidelink interface resources in the sidelink interface resource broadcast message configured by the base station for the sending terminal are received, and whether the sidelink interface resources configured in the broadcast message enable HARQ feedback is determined.

If the HARQ feedback enable rule aims at any one or more of the specified bearer, the specified logical channel or the service bearer which meets the set service characteristics, the sending terminal has the following two modes when organizing a sidelink interface MAC protocol data unit (PDU).

a), When the HARQ feedback enable rule of the Sidelink interface configured for the terminal by the base station indicates the above specified bearer or the specified logical channel or the service bearer meeting the set service characteristics, HARQ feedback of the sidelink is enabled; so that the sending terminal enables the HARQ feedback of the sidelink when the sent MAC PDU includes the data of the specified bearer, the specified logical channel or the service bearer meeting the set service characteristics.

b), When the HARQ feedback enable rule of the Sidelink interface configured for the terminal by the base station indicates the above specified bearer or the specified logical channel or the service bearer meeting the set service characteristics, the HARQ feedback of the sidelink is not enabled; so that the sending terminal does not enable the HARQ feedback of the sidelink when the sent MAC PDU includes the data of the specified bearer, the specified logical channel or the service bearer meeting the set service characteristics.

If the HARQ feedback enable rule is the above-mentioned Rule 4 and Rule 5, the sending terminal receives the channel quality feedback or the HARQ feedback of the Sidelink interface sent by the receiving terminal, and the sending terminal determines whether the subsequent transmission enables the HARQ feedback of the sidelink according to the comparison between the channel quality of the Sidelink interface and the set threshold value configured by the base station or according to the number of data retransmissions of the Sidelink interface in the set period. For example, when the channel quality of the Sidelink interface is higher than the set threshold or the number of HARQ retransmissions is lower than the set threshold, HARQ feedback is not enabled.

After the sending terminal determines to enable or not enable HARQ feedback, the sending terminal sends the transmission resource indication on the Sidelink interface, sends data, and indicates the transmission to enable or not enable HARQ feedback in the sidelink interface resource indication command sent to the receiving terminal; and if HARQ feedback is not enabled, HARQ feedback is not monitored after the sidelink interface transmission.

The receiving terminal 204.

According to the mode for determining the sidelink resources by the receiving terminal, two processing methods are included.

Method 1: the sidelink interface resources in the sidelink interface resource broadcast message configured by the base station for the receiving terminal are received, the received configured sidelink interface resources are determined, configuration of whether the base station enables HARQ feedback for the sidelink interface resources is received simultaneously, the channel quality condition and the HARQ feedback number are counted while sidelink channel quality measurement and HARQ feedback are carried out, and if the specified sidelink interface channel quality threshold value and the specified HARQ retransmission number threshold value are met, HARQ feedback is not sent, and the method does not need the indication of the sending terminal.

Method 2: the transmission resource indication sent by the sending terminal on the Sidelink interface is received, and whether HARQ feedback is needed for transmission on the resource is indicated simultaneously. After the sidelink transmission resource is received on the resource which does not enable HARQ feedback, HARQ feedback is not sent.

Case 3: the base station indicates the configured HARQ feedback enable rule of the Sidelink interface to the terminal through dedicated RRC signaling for configuring the Sidelink interface resources for the terminal, where the rule is an absolute use rule.

The base station side 202:

sending the sidelink resource allocation information in the dedicated RRC signaling for configuring the Sidelink interface resources for the terminal, where the resource allocation information may aim at the online terminal or the offline terminal and may be the conventionally used sidelink interface resource or the specific exceptional resource.

In one embodiment, when allocating the Sidelink interface resources, the base station indicates the HARQ feedback enable rule corresponding to the Sidelink interface resources configured for the terminal, and the HARQ feedback enable rule may be implemented aiming at any one or more of the following.

Rule 1, enabling or not enabling HARQ feedback for the specified sidelink interface resources, where the specified sidelink interface resources may be all or part of currently configured sidelink interface resources.

Rule 2, enabling or not enabling HARQ feedback for the specified region, a zone indication.

In one embodiment, the HARQ feedback enable rule does not take effect immediately after the HARQ feedback enable rule is configured through the special dedicated signaling, the base station sends the PDCCH activation command to the terminal at a Uu interface to enable the configured HARQ feedback enable rule, and the base station may also send the PDCCH deactivation command to the terminal to not enable the configured HARQ feedback enable rule. The default state may be that HARQ feedback is sent or not sent by the sidelink, and the initial state is specified by the protocol or determined in the RRC configuration signaling.

In one embodiment, the base station may also send the sidelink interface resources for receiving data to the receiving terminal through the dedicated RRC signaling while configuring the HARQ enable rule.

The sending terminal 203:

receiving the sidelink interface resources in the dedicated RRC signaling configured by the base station for the sending terminal, determining whether the sidelink interface resources in the dedicated RRC signaling configured in the broadcast message enable HARQ feedback, and determining that after sidelink data is sent on the sidelink interface resources which do not enable HARQ feedback, HARQ feedback is not received.

In one embodiment, the configured HARQ feedback enable rule is enabled or not enabled according to the PDCCH activation/deactivation command, and after sidelink transmission is sent on the sidelink interface resources which do not enable HARQ feedback, HARQ feedback is not received.

The receiving terminal 204.

According to the mode for determining the sidelink resources by the receiving terminal, the processing methods include any one of the following.

Method 1: the sidelink interface resources in the dedicated RRC signaling configured by the base station for the receiving terminal are received, the received configured sidelink interface resources are determined, configuration of whether the base station enables HARQ feedback for the sidelink interface resources is received simultaneously, and when determining that HARQ feedback is not enabled, after the sidelink data is received on the sidelink interface resources which do not enable HARQ feedback, HARQ feedback is not sent.

Method 2: the transmission resource indication sent by the sending terminal on the Sidelink interface is received, and whether HARQ feedback is needed for transmission on the resource is indicated simultaneously. After the sidelink transmission resource is received on the resource which does not enable HARQ feedback, HARQ feedback is not sent.

Case 4: the base station indicates the configured HARQ feedback enable rule of the Sidelink interface to the terminal through the dedicated RRC signaling for configuring Sidelink interface resources for the terminal, where the rule is a relative use rule.

The base station side 202.

The sidelink resource allocation information is sent in the dedicated RRC signaling for configuring the Sidelink interface resources for the terminal, where the resource allocation information may aim at the online terminal or the offline terminal and may be the conventionally used sidelink interface resource or the specific exceptional resource.

In one embodiment, when allocating the Sidelink interface resources, the base station indicates the HARQ feedback enable rule corresponding to the Sidelink interface resources configured for the terminal, and the HARQ feedback enable rule may be implemented aiming at any one or more of the following.

Rule 1, enabling or not enabling HARQ feedback for the specified bearer.

Rule 2, enabling or not enabling HARQ feedback for the specified logical channel.

Rule 3, enabling or not enabling HARQ feedback for the service bearer meeting the set service characteristics.

Rule 4, enabling or not enabling HARQ feedback according to the comparison between the channel quality of the Sidelink interface and the set threshold value.

Rule 5, enabling or not enabling HARQ feedback according to the number of data retransmissions of the Sidelink interface in the set period.

In one embodiment, the HARQ feedback enable rule does not take effect immediately after the HARQ feedback enable rule is configured through the dedicated RRC signaling, the base station sends the PDCCH activation command to the terminal at the Uu interface to enable the configured HARQ feedback enable rule, and the base station may also send the PDCCH deactivation command to the terminal to not enable the configured HARQ feedback enable rule. The default state may be that HARQ feedback is sent or not sent by the sidelink, and the initial state is specified by the protocol or determined in the RRC configuration signaling.

In one embodiment, the base station may also send the sidelink interface resources for receiving data to the receiving terminal through the dedicated RRC signaling while configuring the HARQ enable rule.

The sending terminal 203:

receiving the sidelink interface resources in the dedicated RRC signaling configured by the base station for the sending terminal, and determining whether the sidelink interface resources configured in the dedicated RRC signaling enable HARQ feedback.

In one embodiment, according to the PDCCH activation/deactivation command, HARQ feedback is enabled or not enabled.

If the HARQ feedback enable rule aims at any one or more of the specified bearer, the specified logical channel or the service bearer meeting the set service characteristics, the sending terminal has the following two modes when organizing the sidelink interface MAC PDU.

a), When the HARQ feedback enable rule of the Sidelink interface configured for the terminal by the base station indicates the above specified bearer or the specified logical channel or the service bearer meeting the set service characteristics, HARQ feedback of the sidelink is enabled; so that the sending terminal enables the HARQ feedback of the sidelink when the sent MAC PDU includes the data of the specified bearer, the specified logical channel or the service bearer meeting the set service characteristics.

b), When the HARQ feedback enable rule of the Sidelink interface configured for the terminal by the base station indicates the above specified bearer or the specified logical channel or the service bearer meeting the set service characteristics, the HARQ feedback of the sidelink is not enabled; so that the sending terminal does not enable the HARQ feedback of the sidelink when the sent MAC PDU includes the data of the specified bearer, the specified logical channel or the service bearer meeting the set service characteristics.

If the HARQ feedback enable rule is the above-mentioned Rule 4 and Rule 5, the sending terminal receives the channel quality feedback or the HARQ feedback of the Sidelink interface sent by the receiving terminal, and determines whether the subsequent transmission enables the HARQ feedback of the sidelink according to the comparison between the channel quality of the Sidelink interface and the set threshold value configured by the base station or according to the number of data retransmissions of the Sidelink interface in the set period. For example, when the channel quality of the Sidelink interface is higher than the set threshold or the number of HARQ retransmissions is lower than the set threshold, HARQ feedback is not enabled.

After the sending terminal determines to enable or not enable HARQ feedback, the sending terminal sends the transmission resource indication on the Sidelink interface, sends data, and indicates the transmission to enable or not enable HARQ feedback in the sidelink interface resource indication command sent to the receiving terminal; and if HARQ feedback is not enabled, HARQ feedback is not monitored after the sidelink interface transmission.

The receiving terminal 204.

According to the mode for determining the sidelink resources by the receiving terminal, two processing methods are included.

Method 1: the sidelink interface resources in the dedicated RRC signaling configured by the base station for the receiving terminal are received, the received configured sidelink interface resources are determined, configuration of whether the base station enables HARQ feedback for the sidelink interface resources is received simultaneously, the channel quality condition and the HARQ feedback number are counted while sidelink channel quality measurement and HARQ feedback are carried out, and if the specified sidelink interface channel quality threshold value and the specified HARQ retransmission number threshold value are met, HARQ feedback is not sent, and the method does not need the indication of the sending terminal.

Method 2: the transmission resource indication sent by the sending terminal on the Sidelink interface is received, and whether HARQ feedback is needed for transmission on the resource is indicated simultaneously. After the sidelink transmission resource is received on the resource which does not enable HARQ feedback, HARQ feedback is not sent.

Case 5: the base station indicates the configured HARQ feedback enable rule of the Sidelink interface to the terminal through the MAC CE configured for the terminal.

The base station side 202:

indicating whether Sidelink interface HARQ feedback is enabled or not to the terminal through the LCID value in the sub-header in the MAC CE configured for the terminal.

The configured HARQ feedback enable rule of the Sidelink interface is indicated to the terminal through the specified content in the MAC CE configured for the terminal.

The specified content in the MAC CE configured for the terminal includes any one or more of the following:

(1) the RB identification of the Sidelink interface for enabling or not enabling the HARQ feedback;

(2) the LCID of service data of the Sidelink interface for enabling or not enabling HARQ feedback;

(3) the bitmap for indicating to enable or not enable HARQ feedback for the corresponding RB;

(4) the data QoS threshold for enabling or not enabling HARQ feedback, the QoS threshold may be the 5QI parameter, or the time delay threshold, or the reliability threshold, or the priority threshold;

(5) the physical layer channel quality threshold parameter for enabling or not enabling HARQ feedback; and (6) the physical layer HARQ retransmission number count threshold for enabling or not enabling HARQ feedback.

In one embodiment, the HARQ feedback enable rule of the Sidelink interface indicated by the MAC CE may be implemented as any one or more of the following.

Rule 1, enabling or not enabling HARQ feedback for the sidelink interface resources available to the terminal.

In one embodiment, all Sidelink interface resources available to the terminal are indicated to the terminal to enable or not enable HARQ feedback through the LCID value in the sub-header in the MAC CE configured for the terminal.

Rule 2, enabling or not enabling HARQ feedback for the specified bearer.

In one embodiment, the MAC CE carries the RB ID and can indicate to enable or not enable HARQ feedback by using a single 1 bitRB ID, or the MAC CE only contains the RB ID which enables the HARQ feedback, or the MAC CE only contains the RB ID which does not enable the HARQ feedback; or in a bitmap mode, each bit corresponds to one data radio bearer (DRB) of a Sidelink interface, and 0 or 1 indicates that the corresponding RB enables or does not enable HARQ retransmission.

Rule 3, enabling or not enabling HARQ feedback for the specified logical channel.

In one embodiment, the MAC CE carries the LCID corresponding to the sidelink logical channel, and can indicate to enable or not enable HARQ retransmission by using a single 1 bit indication, or the MAC CE only contains the RB ID which enables the HARQ feedback, or the MAC CE only contains the RB ID which does not enable the HARQ feedback.

Rule 4, enabling or not enabling HARQ feedback for the service bearer meeting the set service characteristics.

In one embodiment, the MAC CE carries the QoS threshold parameter, and the QoS threshold is specifically any one of the 5QI parameter, the time delay threshold, the reliability threshold and the priority threshold.

Rule 5, enabling or not enabling HARQ feedback according to the comparison between the channel quality of the Sidelink interface and the set threshold value.

In one embodiment, the MAC CE carries a channel quality threshold value, for example a dB value which may in particular be expressed as quantized reference signal reception power (RSRP).

Rule 6, enabling or not enabling HARQ feedback according to the number of data retransmissions of the Sidelink interface in the set period.

In one embodiment, the MAC CE carries a threshold value of the number of HARQ retransmissions.

The sending terminal 203.

receiving the HARQ feedback enable rule of the Sidelink interface sent by the base station through the MAC CE.

determining whether to enable HARQ feedback of the sidelink according to the HARQ feedback enable rule of the Sidelink interface; and sending the transmission resource indication on the Sidelink interface, sending data, indicating the transmission to enable or not enable HARQ feedback in the sidelink interface resource indication command sent to the receiving terminal, and if HARQ feedback is not enabled, not monitoring HARQ feedback after the sidelink interface transmission.

The receiving terminal 204.

According to the mode for determining the sidelink resources by the receiving terminal, two processing methods are included.

Method 1: when the receiving terminal receives the sidelink interface resources configured by the base station side, the HARQ feedback enable rule is also received through the MAC CE, and whether to enable HARQ feedback is determined according to the received HARQ feedback enable rule of the Sidelink interface.

Method 2: the transmission resource indication sent by the sending terminal on the Sidelink interface is received, whether HARQ feedback is needed for transmission on the resource is indicated simultaneously on the transmission resource indication, and after the sidelink transmission is received on the resource which does not enable HARQ feedback, HARQ feedback is not sent.

Case 6: the base station indicates the configured HARQ feedback enable rule of the Sidelink interface to the terminal through the PDCCH command for configuring the Sidelink interface resources for the terminal.

The base station side 202:

in the PDCCH command for allocating the sidelink interface resources to the terminal, the base station indicates whether the allocated resources enable HARQ feedback or not, and if the PDCCH command indicates a dynamic scheduling command, the currently dynamically scheduled resources use the indicated HARQ feedback enable rule; and if the PDCCH command indicates a periodic configuration transmission configured grant, the periodically transmitted resources enable the HARQ feedback enable rule indicated by the PDCCH.

The sending terminal 203:

receiving the sidelink interface resource allocation performed by the base station through the PDCCH command of the sidelink interface resources, and enabling or not enabling HARQ feedback according to the HARQ feedback enable rule indicated in the PDCCH command; and sending the transmission resource indication and data on the Sidelink interface, indicating the transmission to enable or not enable HARQ feedback in the sidelink interface resource indication command sent to the receiving terminal, and if HARQ feedback is not enabled, not monitoring HARQ feedback after the sidelink interface transmission.

The receiving terminal 204.

Method 1: the PDCCH command sent by the base station for allocating resources to the sidelink is monitored, data is received on sidelink receiving resources indicated by the PDCCH command, and enabling or not enabling HARQ feedback is determined according to the allocated resources indicated in the PDCCH command.

Method 2: the transmission resource indication sent by the sending terminal on the Sidelink interface is received, whether HARQ feedback is needed for transmission on the resource is indicated simultaneously on the transmission resource indication, and if HARQ feedback is not enabled, HARQ feedback is not sent after the Sidelink interface receives the transmission.

Figure 2C:
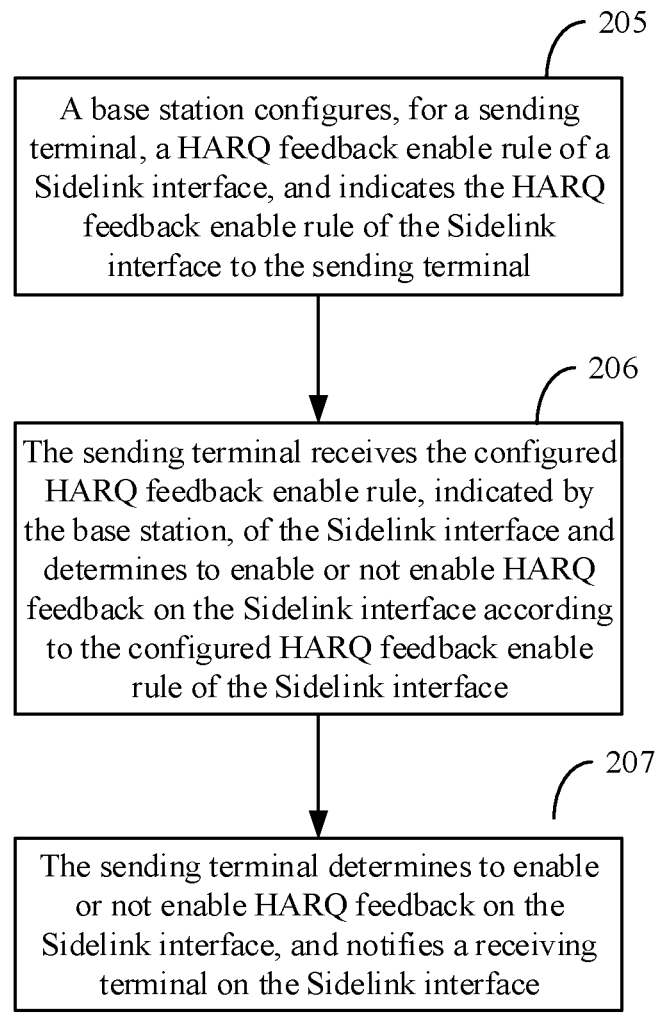
FIG. 2C is a diagram of steps in which a base station indicates HARQ feedback configuration and a terminal determines HARQ feedback configuration.

As shown in FIG. 2C, the method of the above system specifically includes the following steps.

Step 205: the base station configures, for the sending terminal, the HARQ feedback enable rule of the Sidelink interface, and indicates the HARQ feedback enable rule of the Sidelink interface to the sending terminal, or, the base station configures, for the receiving terminal, the HARQ feedback enable rule of the Sidelink interface, and indicates the HARQ feedback enable rule of the Sidelink interface to the receiving terminal.

Step 206: the sending terminal receives the configured HARQ feedback enable rule of the Sidelink interface indicated by the base station and determines to enable or not enable HARQ feedback on the Sidelink interface according to the configured HARQ feedback enable rule of the Sidelink interface, or, the receiving terminal receives the configured HARQ feedback enable rule of the Sidelink interface indicated by the base station and determines to enable or not enable HARQ feedback on the Sidelink interface according to configured HARQ feedback enable rule of the Sidelink interface.

Step 207: the sending terminal determines to enable or not enable HARQ feedback on the Sidelink interface, and notifies the receiving terminal on the Sidelink interface.

Figure 3:
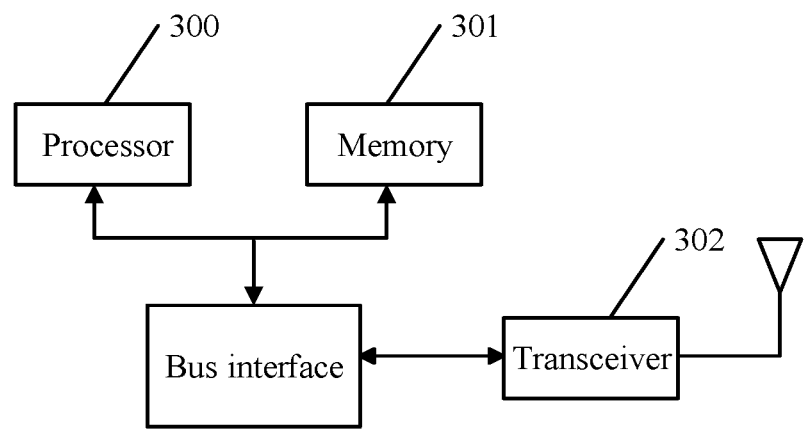
FIG. 3 is a diagram of a device for configuring HARQ feedback between terminal nodes.

As shown in FIG. 3, a device for configuring HARQ feedback between terminal nodes according to the embodiment of the present application includes: a processor 300, a memory 301 and a transceiver 302.

The processor 300 is responsible for managing a bus architecture and general processing, and the memory 301 may store data used by the processor 300 in performing operations. The transceiver 302 is configured to receive and transmit data under the control of the processor 300.

The bus architecture may include any number of interconnected buses and bridges, one or more processors represented by the processor 300 and various circuits of the memory represented by the memory 301 are linked together. The bus architecture may also link various other circuits such as peripheral devices, voltage regulators, power management circuits, and the like, which are well known in the art, and therefore, it will not be described further herein. A bus interface provides an interface. The processor 300 is responsible for managing the bus architecture and general processing, and the memory 301 may store data used by the processor 300 in performing operations.

The processes disclosed according to the embodiments of the present application may be implemented in or by the processor 300. In implementations, the steps of a signal processing flow may be performed by an integrated logic circuit in hardware or instructions in software in the processor 300. The processor 300 may be a general processor, a digital signal processor, a specific integrated circuit, a field programmable gate array or other programmable logic device, a discrete gate or transistor logic device, and a discrete hardware component, which may implement or perform the methods, steps, and logic block diagrams disclosed in the embodiments herein. The general processor may be a microprocessor, any conventional processor, etc. The steps of the methods disclosed in connection with the embodiments of the present application may be embodied directly in hardware processor execution or in a combination of hardware and software modules in the processor. The software module may be located in a random access memory, flash memory, read only memory, programmable read only memory, or electrically erasable programmable memory, registers, or other storage media as is well known in the art. The storage medium is located in the memory 301, and the processor 300 reads the information in the memory 301 and completes the steps of the signal processing flow in combination with the hardware thereof.

The processor 300 is configured to read a program in the memory 301 and execute the following processes.

In one embodiment, the processor 300 is specifically configured to:

configure a HARQ feedback enable rule of a Sidelink interface for a terminal; and indicate the configured HARQ feedback enable rule of the Sidelink interface to the terminal for determining, according to the configured HARQ feedback enable rule of the Sidelink interface, to enable or not enable HARQ feedback on the Sidelink interface.

In one embodiment, the processor is specifically configured to:

indicate the configured HARQ feedback enable rule of the Sidelink interface to the terminal through a broadcast message for configuring Sidelink interface resources for the terminal.

In one embodiment, the processor is specifically configured to:

indicate the configured HARQ feedback enable rule of the Sidelink interface to the terminal through dedicated radio resource control (RRC) signaling for configuring Sidelink interface resources for the terminal.

In one embodiment, the processor is further specifically configured to:

send a PDCCH deactivation command to the terminal for indicating the terminal to not enable the configured HARQ feedback enable rule; or send a PDCCH activation command to the terminal for indicating the terminal to enable the configured HARQ feedback enable rule.

In one embodiment, the processor is specifically configured to:

indicate the configured HARQ feedback enable rule of the Sidelink interface to the terminal through a MAC CE configured for the terminal.

In one embodiment, the processor is specifically configured to:

indicate the terminal to enable or not enable HARQ feedback of the Sidelink interface through a LCID value in a sub-header in the MAC CE configured for the terminal; or indicate the configured HARQ feedback enable rule of the Sidelink interface to the terminal through a specified content in the MAC CE configured for the terminal.

In one embodiment, the specified content in the MAC CE configured for the terminal includes:

a radio bearer (RB) identification of the Sidelink interface for enabling or not enabling HARQ feedback; or a LCID of service data of the Sidelink interface for enabling or not enabling HARQ feedback; or a bitmap for indicating to enable or not enable HARQ feedback for a corresponding RB; or a data quality of service (QoS) threshold for enabling or not enabling HARQ feedback; or a physical layer channel quality threshold parameter for enabling or not enabling HARQ feedback; or a physical layer HARQ retransmission number count threshold for enabling or not enabling HARQ feedback.

In one embodiment, the processor is specifically configured to:

indicate the configured HARQ feedback enable rule of the Sidelink interface to the terminal through a PDCCH command for configuring the Sidelink interface resources for the terminal.

In one embodiment, in response to the PDCCH command being a dynamic resource scheduling command, the configured HARQ feedback enable rule of the Sidelink interface is a HARQ feedback enable rule of the Sidelink interface used by the currently dynamically scheduled Sidelink interface resources; and in response to the PDCCH command being a periodic resource scheduling command, the configured HARQ feedback enable rule of the Sidelink interface is a HARQ feedback enable rule of the Sidelink interface used by the periodically scheduled Sidelink interface resources.

In one embodiment, the HARQ feedback enable rule of the Sidelink interface configured for the terminal of the Sidelink interface includes any one or more of the following rules:

enabling or not enabling HARQ feedback for the specified Sidelink interface resources;

enabling or not enabling HARQ feedback for terminals in a specified region;

enabling or not enabling HARQ feedback for a specified bearer;

enabling or not enabling HARQ feedback for a specified logical channel;

enabling or not enabling HARQ feedback for a service bearer which meets set service characteristics;

enabling or not enabling HARQ feedback according to the comparison between the channel quality of the Sidelink interface and a set threshold value;

enabling or not enabling HARQ feedback according to the number of data retransmissions of the Sidelink interface in a set period; and enabling or not enabling HARQ feedback according to a scheduling transmission mechanism of the Sidelink interface.

In one embodiment, the specified Sidelink interface resources are specified frequency resources, or specified BWP resources, or specified carrier resources.

In one embodiment, the device is applied to a base station or relay node or CU or DU in a base station unit, or a third party terminal for scheduling Sidelink transmissions between the terminals to configure the HARQ feedback enable rule of the Sidelink interface for the terminal.

Figure 4:
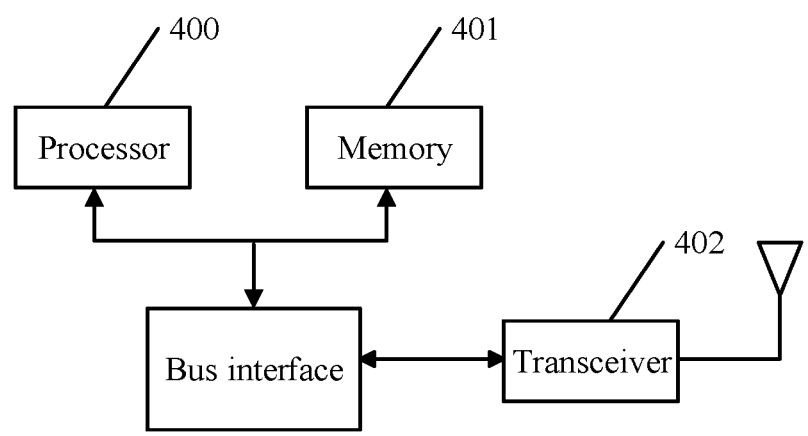
FIG. 4 is a terminal for determining HARQ feedback configuration.

As shown in FIG. 4, a terminal for determining HARQ feedback configuration according to the embodiment of the present application includes a processor 400, a memory 401 and a transceiver 402.

The processor 400 is responsible for managing a bus architecture and general processing, and the memory 401 may store data used by the processor 400 in performing operations. The transceiver 402 is configured to receive and transmit data under the control of the processor 400.

The bus architecture may include any number of interconnected buses and bridges, one or more processors represented by the processor 400 and various circuits of the memory represented by the memory 401 are linked together. The bus architecture may also link various other circuits such as peripheral devices, voltage regulators, power management circuits, and the like, which are well known in the art, and therefore, it will not be described further herein. A bus interface provides an interface. The processor 400 is responsible for managing the bus architecture and general processing, and the memory 401 may store data used by the processor 400 in performing operations.

The processes disclosed according to the embodiments of the present application may be implemented in or by the processor 400. In implementations, the steps of a signal processing flow may be performed by an integrated logic circuit in hardware or instructions in software in the processor 400. The processor 400 may be a general processor, a digital signal processor, a specific integrated circuit, a field programmable gate array or other programmable logic device, a discrete gate or transistor logic device, and a discrete hardware component, which may implement or perform the methods, steps, and logic block diagrams disclosed in the embodiments herein. The general processor may be a microprocessor, any conventional processor, etc. The steps of the methods disclosed in connection with the embodiments of the present application may be embodied directly in hardware processor execution or in a combination of hardware and software modules in the processor. The software module may be located in a random access memory, flash memory, read only memory, programmable read only memory, or electrically erasable programmable memory, registers, or other storage media as is well known in the art. The storage medium is located in the memory 401, and the processor 400 reads the information in the memory 401 and completes the steps of the signal processing flow in combination with the hardware thereof.

The processor 400 is configured to read a program in the memory 401 and execute the following processes.

In one embodiment, the processor 400 is specifically configured to:

receive a configured HARQ feedback enable rule, indicated by a configuration node, of a Sidelink interface; and determine to enable or not enable HARQ feedback on the Sidelink interface according to the configured HARQ feedback enable rule of the Sidelink interface.

In one embodiment, the processor is specifically configured to:

determine the indicated configured HARQ feedback enable rule of the Sidelink interface by receiving a broadcast message from the configuration node for configuring Sidelink interface resources for a terminal.

In one embodiment, the configured HARQ feedback enable rule of the Sidelink interface is a HARQ feedback enable rule of the Sidelink interface used by the terminal when the terminal uses the configured Sidelink interface resources.

In one embodiment, the processor is specifically configured to:

determine the indicated configured HARQ feedback enable rule of the Sidelink interface by receiving dedicated RRC signaling from the configuration node for configuring the Sidelink interface resources.

In one embodiment, the processor is further specifically configured to:

receive a PDCCH deactivation command sent by the configuration node, and determine to not enable the configured HARQ feedback enable rule; or receive a PDCCH activation command sent by the configuration node, and determine to enable the configured HARQ feedback enable rule.

In one embodiment, the processor is specifically configured to:

determine the indicated configured HARQ feedback enable rule of the Sidelink interface through a MAC CE configured by the configuration node.

In one embodiment, the processor is specifically configured to:

determine the indicated configured HARQ feedback enable rule of the Sidelink interface by a specified indication bit in a sub-header in the MAC CE configured by the configuration node; or determine the indicated configured HARQ feedback enable rule of the Sidelink interface through a specified content in the MAC CE configured by the configuration node.

In one embodiment, the received specified indication bit in the sub-header in the MAC CE configured by the configuration node is configured to: indicate to not enable HARQ feedback through a fixed value, or to indicate to enable or not enable HARQ feedback through different indication values respectively.

In one embodiment, the specified content in the MAC CE configured by the configuration node includes:

a radio bearer (RB) identification of the Sidelink interface for enabling or not enabling HARQ feedback; or a LCID of service data of the Sidelink interface for enabling or not enabling HARQ feedback; or a bitmap for indicating to enable or not enable HARQ feedback for a corresponding RB; or a data QoS threshold for enabling or not enabling HARQ feedback; or a physical layer channel quality threshold parameter for enabling or not enabling HARQ feedback; or a physical layer HARQ retransmission number count threshold for enabling or not enabling HARQ feedback.

In one embodiment, the receiving the configured HARQ feedback enable rule, indicated by the configuration node, of the Sidelink interface includes:

determining the indicated configured HARQ feedback enable rule of the Sidelink interface is determined by receiving a PDCCH command for the Sidelink interface resources configured by the configuration node.

In one embodiment, in response to the PDCCH command being a dynamic resource scheduling command, the configured HARQ feedback enable rule of the Sidelink interface is a HARQ feedback enable rule of the Sidelink interface used by the currently dynamically scheduled Sidelink interface resources; and in response to the PDCCH command is a periodic resource scheduling command, the configured HARQ feedback enable rule of the Sidelink interface is a HARQ feedback enable rule of the Sidelink interface used by the periodically scheduled Sidelink interface resources.

In one embodiment, the configured HARQ feedback enable rule of the Sidelink interface includes any one or more of the following rules:

enabling or not enabling HARQ feedback for the specified Sidelink interface resources;

enabling or not enabling HARQ feedback for terminals in a specified region;

enabling or not enabling HARQ feedback for a specified bearer;

enabling or not enabling HARQ feedback for a specified logical channel;

enabling or not enabling HARQ feedback for a service bearer which meets set service characteristics;

enabling or not enabling HARQ feedback according to the comparison between the channel quality of the Sidelink interface and a set threshold value;

enabling or not enabling HARQ feedback according to the number of data retransmissions of the Sidelink interface in a set period; and enabling or not enabling HARQ feedback according to a scheduling transmission mechanism of the Sidelink interface.

In one embodiment, the specified Sidelink interface resources are specified frequency resources, or specified BWP resources, or specified carrier resources.

In one embodiment, the configuration node is a base station or relay node or CU or DU in a base station unit, or a third party terminal for scheduling Sidelink transmissions between terminals.

In one embodiment, after determining the terminal to enable or not enable HARQ feedback on the Sidelink interface according to the configured HARQ feedback enable rule of the Sidelink interface, the processor is configured to:

notify a peer terminal on the Sidelink interface to enable or not enable HARQ feedback on the Sidelink interface.

Figure 5:
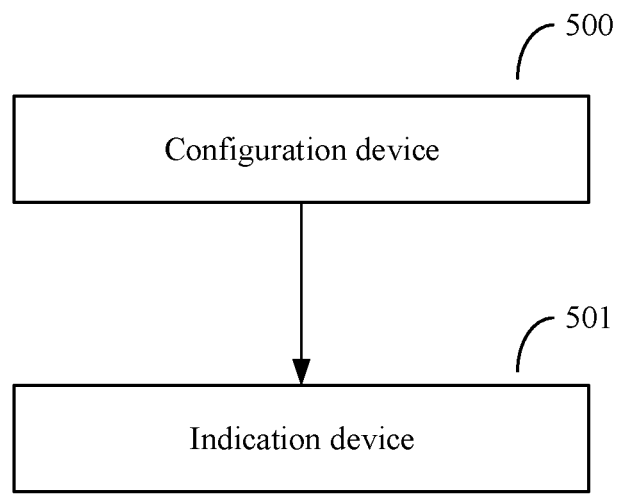
FIG. 5 is a block diagram of a terminal for configuring HARQ feedback configuration between terminal nodes.

As shown in FIG. 5, a device for configuring HARQ feedback between terminal nodes according to the embodiment of the present application includes:

a configuration device 500 configured to configure a HARQ feedback enable rule of a Sidelink interface for a terminal; and an indication device 501 configured to indicate the configured HARQ feedback enable rule of the Sidelink interface to the terminal for determining, according to the configured HARQ feedback enable rule of the Sidelink interface, to enable or not enable HARQ feedback on the Sidelink interface.

In one embodiment, the indication device 501 is configured to:

indicate the configured HARQ feedback enable rule of the Sidelink interface to the terminal through a broadcast message for configuring Sidelink interface resources for the terminal.

In one embodiment, the indication device 501 is configured to:

indicate the configured HARQ feedback enable rule of the Sidelink interface to the terminal through dedicated RRC signaling for configuring Sidelink interface resources for the terminal.

In one embodiment, the indication device 501 is further configured to:

send a PDCCH deactivation command to the terminal for indicating the terminal to not enable the configured HARQ feedback enable rule; or send a PDCCH activation command to the terminal for indicating the terminal to enable the configured HARQ feedback enable rule.

In one embodiment, the indication device 501 is configured to:

indicate the configured HARQ feedback enable rule of the Sidelink interface to the terminal through a MAC CE configured for the terminal.

In one embodiment, the indication device 501 is specifically configured to:

indicate the terminal to enable or not enable HARQ feedback of the Sidelink interface through a LCID value in a sub-header in the MAC CE configured for the terminal; or indicate the configured HARQ feedback enable rule of the Sidelink interface to the terminal through a specified content in the MAC CE configured for the terminal.

In one embodiment, the specified content in the MAC CE configured for the terminal includes:

a radio bearer (RB) identification of the Sidelink interface for enabling or not enabling HARQ feedback; or a LCID of service data of the Sidelink interface for enabling or not enabling HARQ feedback; or a bitmap for indicating to enable or not enable HARQ feedback for a corresponding RB; or a data QoS threshold for enabling or not enabling HARQ feedback; or a physical layer channel quality threshold parameter for enabling or not enabling HARQ feedback; or a physical layer HARQ retransmission number count threshold for enabling or not enabling HARQ feedback.

In one embodiment, the indication device 501 is configured to:

indicate the configured HARQ feedback enable rule of the Sidelink interface to the terminal through a PDCCH command for configuring the Sidelink interface resources for the terminal.

In one embodiment, the indication device 501 is configured that:

in response to the PDCCH command being a dynamic resource scheduling command, the configured HARQ feedback enable rule of the Sidelink interface is a HARQ feedback enable rule of the Sidelink interface used by the currently dynamically scheduled Sidelink interface resources; and in response to the PDCCH command being a periodic resource scheduling command, the configured HARQ feedback enable rule of the Sidelink interface is a HARQ feedback enable rule of the Sidelink interface used by the periodically scheduled Sidelink interface resources.

In one embodiment, the HARQ feedback enable rule of the Sidelink interface configured for the terminal of the Sidelink interface includes any one or more of the following rules:

enabling or not enabling HARQ feedback for the specified Sidelink interface resources;

enabling or not enabling HARQ feedback for terminals in a specified region;

enabling or not enabling HARQ feedback for a specified bearer;

enabling or not enabling HARQ feedback for a specified logical channel;

enabling or not enabling HARQ feedback for a service bearer which meets set service characteristics;

enabling or not enabling HARQ feedback according to the comparison between the channel quality of the Sidelink interface and a set threshold value;

enabling or not enabling HARQ feedback according to the number of data retransmissions of the Sidelink interface in a set period; and enabling or not enabling HARQ feedback according to a scheduling transmission mechanism of the Sidelink interface.

In one embodiment, the specified Sidelink interface resources are specified frequency resources, or specified BWP resources, or specified carrier resources.

In one embodiment, the method is applied to a base station or relay node or CU or DU in a base station unit, or a third party terminal for scheduling Sidelink transmissions between the terminals to configure the HARQ feedback enable rule of the Sidelink interface for the terminal.

Figure 6:
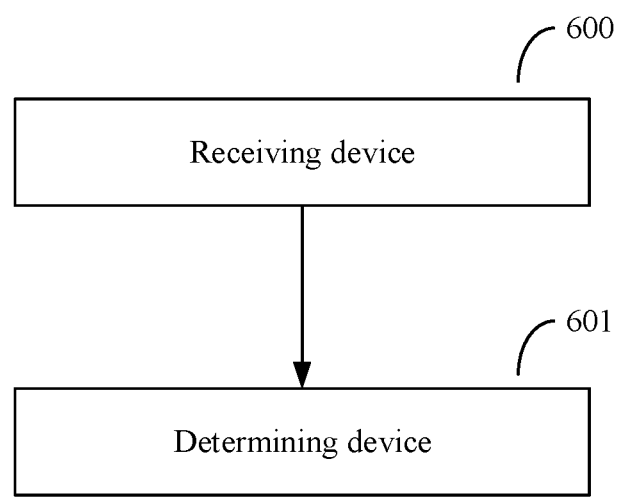
FIG. 6 is a block diagram of a terminal for determining HARQ feedback configuration.

As shown in FIG. 6, a terminal for determining HARQ feedback configuration according to the embodiment of the present application includes:

a receiving device 600, configured to receive a configured HARQ feedback enable rule, indicated by a configuration node, of a Sidelink interface; and a determining device 601, configured to determine to enable or not enable HARQ feedback on the Sidelink interface according to the configured HARQ feedback enable rule of the Sidelink interface.

In one embodiment, the receiving device 600 is configured to:

determine the indicated configured HARQ feedback enable rule of the Sidelink interface by receiving a broadcast message from the configuration node for configuring Sidelink interface resources for the terminal.

In one embodiment, the configured HARQ feedback enable rule of the Sidelink interface is a HARQ feedback enable rule of the Sidelink interface used by the terminal when the terminal uses the configured Sidelink interface resources.

In one embodiment, the receiving device 600 is configured to:

determine the indicated configured HARQ feedback enable rule of the Sidelink interface by receiving dedicated RRC signaling from the configuration node for configuring the Sidelink interface resources.

In one embodiment, the receiving device 600 is specifically configured to:

receive a PDCCH deactivation command sent by the configuration node, and determine to not enable the configured HARQ feedback enable rule; or receive a PDCCH activation command sent by the configuration node, and determine to enable the configured HARQ feedback enable rule.

In one embodiment, the receiving device 600 is configured to:

determine the indicated configured HARQ feedback enable rule of the Sidelink interface through a MAC CE configured by the configuration node.

In one embodiment, the receiving device 600 is specifically configured to:

determine the indicated configured HARQ feedback enable rule of the Sidelink interface by a specified indication bit in a sub-header in the MAC CE configured by the configuration node; or determine the indicated configured HARQ feedback enable rule of the Sidelink interface through a specified content in the MAC CE configured by the configuration node.

In one embodiment, the received specified indication bit in the sub-header in the MAC CE configured by the configuration node is configured to: indicate to not enable HARQ feedback through a fixed value, or to indicate to enable or not enable HARQ feedback through different indication values respectively.

In one embodiment, the specified content in the MAC CE configured by the configuration node includes:

a radio bearer (RB) identification of the Sidelink interface for enabling or not enabling HARQ feedback; or a LCID of service data of the Sidelink interface for enabling or not enabling HARQ feedback; or a bitmap for indicating to enable or not enable HARQ feedback for a corresponding RB; or a data QoS threshold for enabling or not enabling HARQ feedback; or a physical layer channel quality threshold parameter for enabling or not enabling HARQ feedback; or a physical layer HARQ retransmission number count threshold for enabling or not enabling HARQ feedback.

In one embodiment, the receiving device 600 is configured to:

determine the indicated configured HARQ feedback enable rule of the Sidelink interface by receiving a PDCCH command for the Sidelink interface resources configured by the configuration node.

In one embodiment, in response to the PDCCH command being a dynamic resource scheduling command, the configured HARQ feedback enable rule of the Sidelink interface is a HARQ feedback enable rule of the Sidelink interface used by the currently dynamically scheduled Sidelink interface resources; and in response to the PDCCH command being a periodic resource scheduling command, the configured HARQ feedback enable rule of the Sidelink interface is a HARQ feedback enable rule of the Sidelink interface used by the periodically scheduled Sidelink interface resources.

In one embodiment, the configured HARQ feedback enable rule of the Sidelink interface includes any one or more of the following rules:

enabling or not enabling HARQ feedback for the specified Sidelink interface resources;

enabling or not enabling HARQ feedback for terminals in a specified region;

enabling or not enabling HARQ feedback for a specified bearer;

enabling or not enabling HARQ feedback for a specified logical channel;

enabling or not enabling HARQ feedback for a service bearer which meets set service characteristics;

enabling or not enabling HARQ feedback according to the comparison between the channel quality of the Sidelink interface and a set threshold value;

enabling or not enabling HARQ feedback according to the number of data retransmissions of the Sidelink interface in a set period; and enabling or not enabling HARQ feedback according to a scheduling transmission mechanism of the Sidelink interface.

In one embodiment, the specified Sidelink interface resources are specified frequency resources, or specified BWP resources, or specified carrier resources.

In one embodiment, the configuration node is a base station or relay node or CU or DU in a base station unit, or a third party terminal for scheduling Sidelink transmissions between terminals.

In one embodiment, after determining the terminal to enable or not enable HARQ feedback on the Sidelink interface according to the configured HARQ feedback enable rule of the Sidelink interface, the terminal is further configured to:

notify a peer terminal on the Sidelink interface to enable or not enable HARQ feedback on the Sidelink interface.

The embodiment of the present application provides a readable storage medium that is a non-volatile storage medium, the readable storage medium is a non-volatile readable storage medium including a program code, and when the program code runs on a computing device, the program code is configured to enable the computing device to perform the steps in the above method for configuring HARQ feedback between terminal nodes.

The embodiment of the present application provides a readable storage medium that is a non-volatile storage medium, the readable storage medium is a non-volatile readable storage medium including a program code, and when the program code runs on a computing device, the program code is configured to enable the computing device to perform the steps in the above method for determining HARQ feedback configuration by the terminal.

The embodiment of the present application provides a computer program product including instructions, and when the instructions are executed on a computer, the computing device performs the steps of the above method for configuring HARQ feedback between terminal nodes.

The embodiment of the present application provides a computer program product including instructions, and when the instructions are executed on a computer, a computing device performs the steps of the above method for determining HARQ feedback configuration by the terminal.

Based on the same inventive concept, the embodiment of the present application also provides a method for configuring HARQ feedback between terminal nodes. Since a device corresponding to the method is a network side device, i.e. a base station, in a system in which a base station indicates HARQ feedback configuration and a terminal determines HARQ feedback configuration in the embodiment of the present application, and the principle for solving the problem by the method is similar to that of the device, the implementation of the method may be referred to as the implementation of the system, and the repetition is omitted.

Figure 7:
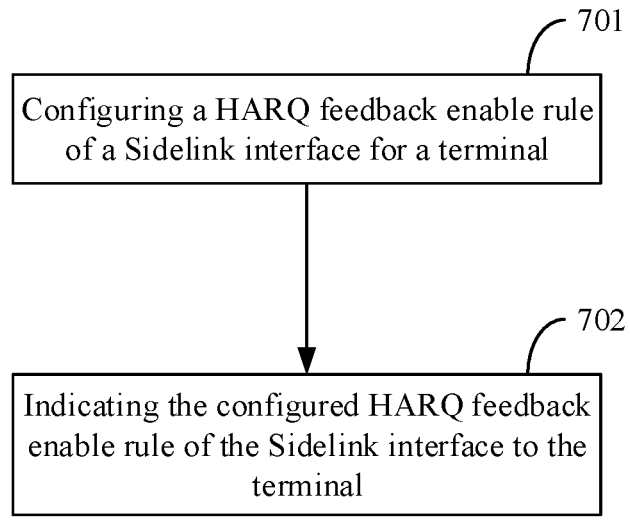
FIG. 7 is a step diagram a method for configuring HARQ feedback between terminal nodes.

As shown in FIG. 7, the method for configuring HARQ feedback between terminal nodes provided according to the embodiment of the present application includes:

step 701: configuring a HARQ feedback enable rule of a Sidelink interface for a terminal; and step 702: indicating the configured HARQ feedback enable rule of the Sidelink interface to the terminal for determining, according to the configured HARQ feedback enable rule of the Sidelink interface, to enable or not enable HARQ feedback on the Sidelink interface.

In one embodiment, the indicating the configured HARQ feedback enable rule of the Sidelink interface to the terminal, includes:

indicating the configured HARQ feedback enable rule of the Sidelink interface to the terminal through a broadcast message for configuring Sidelink interface resources for the terminal.

In one embodiment, the indicating the configured HARQ feedback enable rule of the Sidelink interface to the terminal, includes:

indicating the configured HARQ feedback enable rule of the Sidelink interface is indicated to the terminal through dedicated RRC signaling for configuring Sidelink interface resources for the terminal.

In one embodiment, the indicating the configured HARQ feedback enable rule of the Sidelink interface to the terminal, further includes:

sending a PDCCH deactivation command to the terminal, for indicating the terminal to not enable the configured HARQ feedback enable rule; or sending a PDCCH activation command to the terminal for indicating the terminal to enable the configured HARQ feedback enable rule.

In one embodiment, the indicating the configured HARQ feedback enable rule of the Sidelink interface to the terminal, includes:

indicating the configured HARQ feedback enable rule of the Sidelink interface to the terminal through a MAC CE configured for the terminal.

In one embodiment, the indicating the configured HARQ feedback enable rule of the Sidelink interface to the terminal through the MAC CE configured for the terminal, includes:

indicating the terminal to enable or not enable HARQ feedback of the Sidelink interface through a LCID value in a sub-header in the MAC CE configured for the terminal; or indicating the configured HARQ feedback enable rule of the Sidelink interface to the terminal through a specified content in the MAC CE configured for the terminal.

In one embodiment, the specified content in the MAC CE configured for the terminal includes:

a RB identification of the Sidelink interface for enabling or not enabling HARQ feedback; or a LCID of service data of the Sidelink interface for enabling or not enabling HARQ feedback; or a bitmap for indicating to enable or not enable HARQ feedback for a corresponding RB; or a data QoS threshold for enabling or not enabling HARQ feedback; or a physical layer channel quality threshold parameter for enabling or not enabling HARQ feedback; or a physical layer HARQ retransmission number count threshold for enabling or not enabling HARQ feedback.

In one embodiment, the indicating the configured HARQ feedback enable rule of the Sidelink interface to the terminal, includes:

indicating the configured HARQ feedback enable rule of the Sidelink interface is indicated to the terminal through a PDCCH command for configuring the Sidelink interface resources for the terminal.

In one embodiment, in response to the PDCCH command being a dynamic resource scheduling command, the configured HARQ feedback enable rule of the Sidelink interface is a HARQ feedback enable rule of the Sidelink interface used by the currently dynamically scheduled Sidelink interface resources; and in response to the PDCCH command being a periodic resource scheduling command, the configured HARQ feedback enable rule of the Sidelink interface is a HARQ feedback enable rule of the Sidelink interface used by the periodically scheduled Sidelink interface resources.

In one embodiment, the HARQ feedback enable rule of the Sidelink interface configured for the terminal of the Sidelink interface includes any one or more of the following rules:

enabling or not enabling HARQ feedback for the specified Sidelink interface resources;

enabling or not enabling HARQ feedback for terminals in a specified region;

enabling or not enabling HARQ feedback for a specified bearer;

enabling or not enabling HARQ feedback for a specified logical channel;

enabling or not enabling HARQ feedback for a service bearer which meets set service characteristics;

enabling or not enabling HARQ feedback according to the comparison between the channel quality of the Sidelink interface and a set threshold value;

enabling or not enabling HARQ feedback according to the number of data retransmissions of the Sidelink interface in a set period; and enabling or not enabling HARQ feedback according to a scheduling transmission mechanism of the Sidelink interface.

In one embodiment, the specified Sidelink interface resources are specified frequency resources, or specified BWP resources, or specified carrier resources.

In one embodiment, the method is applied to a base station or relay node or CU or DU in a base station unit, or a third party terminal for scheduling Sidelink transmissions between the terminals to configure the HARQ feedback enable rule of the Sidelink interface for the terminal.

Based on the same inventive concept, the embodiment of the present application also provides a method for determining HARQ feedback configuration by a terminal. Since a device corresponding to the method is a terminal in a system in which a base station indicates HARQ feedback configuration and the terminal determines HARQ feedback configuration in the embodiment of the present application, and the principle for solving the problem by the method is similar to that of the terminal, the implementation of the method may be referred to as the implementation of the system, and the repetition is omitted.

Figure 8:
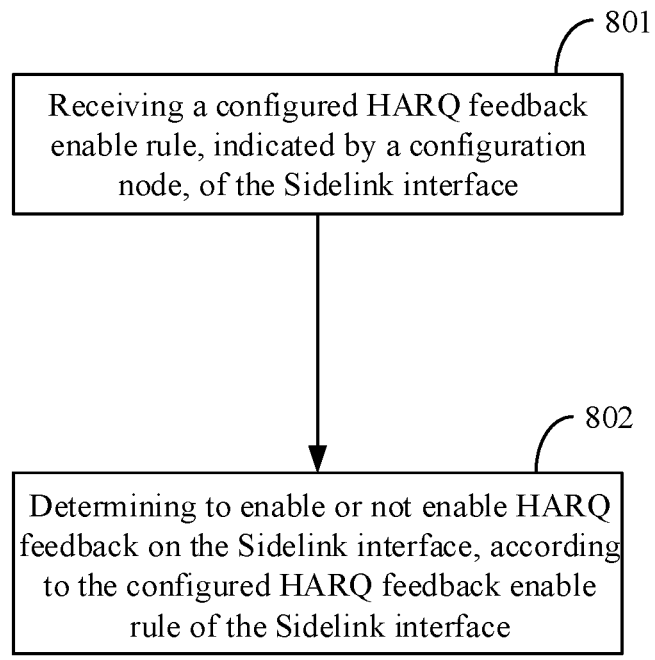
FIG. 8 is a step diagram of a method for configuring HARQ feedback between terminal nodes.

As shown in FIG. 8, a method for determining HARQ feedback configuration by the terminal provided according to the embodiment of the present application includes:

step 801: receiving a configured HARQ feedback enable rule, indicated by a configuration node, of a Sidelink interface; and step 802: determining to enable or not enable HARQ feedback on the Sidelink interface according to the configured HARQ feedback enable rule of the Sidelink interface.

In one embodiment, the receiving the configured HARQ feedback enable rule, indicated by the configuration node, of the Sidelink interface, includes:

determining the indicated configured HARQ feedback enable rule of the Sidelink interface by receiving a broadcast message from the configuration node for configuring Sidelink interface resources for the terminal.

In one embodiment, the configured HARQ feedback enable rule of the Sidelink interface is a HARQ feedback enable rule of the Sidelink interface used by the terminal when the terminal uses the configured Sidelink interface resources.

In one embodiment, the receiving the configured HARQ feedback enable rule, indicated by the configuration node, of the Sidelink interface, includes:

determining the indicated configured HARQ feedback enable rule of the Sidelink interface by receiving dedicated RRC signaling from the configuration node for configuring the Sidelink interface resources.

In one embodiment, the receiving the configured HARQ feedback enable rule, indicated by the configuration node, of the Sidelink interface, further includes:

receiving a PDCCH deactivation command sent by the configuration node to determine to not enable the configured HARQ feedback enable rule; or receiving a PDCCH activation command sent by the configuration node to determine to enable the configured HARQ feedback enable rule.

In one embodiment, the receiving the configured HARQ feedback enable rule, indicated by the configuration node, of the Sidelink interface, includes:

determining the indicated configured HARQ feedback enable rule of the Sidelink interface through a MAC CE configured by the configuration node.

In one embodiment, determining the indicated configured HARQ feedback enable rule of the Sidelink interface by receiving the MAC CE configured by the configuration node, includes:

determining the indicated configured HARQ feedback enable rule of the Sidelink interface by a specified indication bit in a sub-header in the MAC CE configured by the configuration node; or determining the indicated configured HARQ feedback enable rule of the Sidelink interface through a specified content in the MAC CE configured by the configuration node.

In one embodiment, the received specified indication bit in the sub-header in the MAC CE configured by the configuration node is configured to: indicate to not enable HARQ feedback through a fixed value, or to indicate to enable or not enable HARQ feedback through different indication values respectively.

In one embodiment, the specified content in the MAC CE configured by the configuration node includes:

a RB identification of the Sidelink interface for enabling or not enabling HARQ feedback; or a LCID of service data of the Sidelink interface for enabling or not enabling HARQ feedback; or a bitmap for indicating to enable or not enable HARQ feedback for a corresponding RB; or a data QoS threshold for enabling or not enabling HARQ feedback; or a physical layer channel quality threshold parameter for enabling or not enabling HARQ feedback; or a physical layer HARQ retransmission number count threshold for enabling or not enabling HARQ feedback.

In one embodiment, the receiving the configured HARQ feedback enable rule, indicated by the configuration node, of the Sidelink interface, includes:

determining the indicated configured HARQ feedback enable rule of the Sidelink interface by receiving a PDCCH command for the Sidelink interface resources configured by the configuration node.

In one embodiment, in response to the PDCCH command being a dynamic resource scheduling command, the configured HARQ feedback enable rule of the Sidelink interface is a HARQ feedback enable rule of the Sidelink interface used by the currently dynamically scheduled Sidelink interface resources; and in response to the PDCCH command being a periodic resource scheduling command, the configured HARQ feedback enable rule of the Sidelink interface is a HARQ feedback enable rule of the Sidelink interface used by the periodically scheduled Sidelink interface resources.

In one embodiment, the configured HARQ feedback enable rule of the Sidelink interface includes any one or more of the following rules:

enabling or not enabling HARQ feedback for the specified Sidelink interface resources;

enabling or not enabling HARQ feedback for terminals in a specified region;

enabling or not enabling HARQ feedback for a specified bearer;

enabling or not enabling HARQ feedback for a specified logical channel;

enabling or not enabling HARQ feedback for a service bearer which meets set service characteristics;

enabling or not enabling HARQ feedback according to the comparison between the channel quality of the Sidelink interface and a set threshold value;

enabling or not enabling HARQ feedback according to the number of data retransmissions of the Sidelink interface in a set period; and enabling or not enabling HARQ feedback according to a scheduling transmission mechanism of the Sidelink interface.

In one embodiment, the specified Sidelink interface resources are specified frequency resources, or specified BWP resources, or specified carrier resources.

In one embodiment, the configuration node is a base station or relay node or CU or DU in a base station unit, or a third party terminal for scheduling Sidelink transmissions between terminals.

In one embodiment, after determining the terminal to enable or not enable HARQ feedback on the Sidelink interface according to the configured HARQ feedback enable rule of the Sidelink interface, the method includes:

notifying a peer terminal on the Sidelink interface to enable or not enable HARQ feedback on the Sidelink interface.

The present application has been described above with reference to block diagrams and/or flow diagrams illustrating methods, devices (systems) and/or computer program products according to the embodiments of the present application. It will be understood that one block of the block diagrams and/or flow diagrams, and combinations of blocks in the block diagrams and/or flow diagrams, can be implemented by computer program instructions. These computer program instructions may be provided to a processor of a general computer, special computer, and/or other programmable data processing devices to produce a machine, and the instructions, which execute via the computer processor and/or other programmable data processing devices, create the method for implementing the functions/acts specified in the blocks in the block diagrams and/or flow diagrams.

Accordingly, the present application may also be implemented in hardware and/or software (including firmware, resident software, microcode, etc.). Further, the application may take the form of a computer program product usable on a computer or computer-readable storage medium having a computer-usable or computer-readable program code embodied in the medium for use by or in connection with an instruction execution system. In the context of this application, the computer-usable or computer-readable medium can be any medium that may contain, store, communicate, transmit, or transport the program for use by or in connection with the instruction system, device, or equipment.

What is claimed is:

1. A method for configuring hybrid automatic repeat request (HARQ) feedback between terminal nodes, comprising:
configuring a HARQ feedback enable rule of a Sidelink interface for a terminal; and
indicating the HARQ feedback enable rule of the Sidelink interface to the terminal for determining, according to the configured HARQ feedback enable rule of the Sidelink interface, to enable or not enable HARQ feedback on the Sidelink interface;
wherein the HARQ feedback enable rule of the Sidelink interface configured for the terminal of the Sidelink interface indicates any one or more of:
whether to enable HARQ feedback for specified Sidelink interface resources;
whether to enable HARQ feedback for terminals in a specified region;
whether to enable HARQ feedback for a specified bearer;
whether to enable HARQ feedback for a specified logical channel;
whether to enable HARQ feedback according to a quantity of data retransmissions of the Sidelink interface in a set period; and
whether to enable HARQ feedback according to a scheduling transmission mechanism of the Sidelink interface, wherein whether to enable HARQ feedback according to the scheduling transmission mechanism of the Sidelink interface comprises: whether to enable HARQ feedback for a currently activated preconfigured resource in a scheduling command for activating the preconfigured resource, or, whether to enable HARQ feedback in a currently dynamic scheduling command.

2. The method according to claim 1, wherein the indicating the configured HARQ feedback enable rule of the Sidelink interface to the terminal comprises:
indicating the configured HARQ feedback enable rule of the Sidelink interface to the terminal through a broadcast message for configuring Sidelink interface resources for the terminal; or
indicating the configured HARQ feedback enable rule of the Sidelink interface to the terminal through dedicated radio resource control (RRC) signaling for configuring Sidelink interface resources for the terminal.

3. The method according to claim 2, wherein in a case of indicating the configured HARQ feedback enable rule of the Sidelink interface to the terminal through the dedicated RRC signaling for configuring Sidelink interface resources for the terminal, the method further comprises:
sending a physical downlink control channel (PDCCH) deactivation command to the terminal, for indicating the terminal to not enable the configured HARQ feedback enable rule; or
sending a PDCCH activation command to the terminal for indicating the terminal to enable the configured HARQ feedback enable rule.

4. The method according to claim 1, wherein the indicating the configured HARQ feedback enable rule of the Sidelink interface to the terminal comprises:
indicating the configured HARQ feedback enable rule of the Sidelink interface to the terminal through a medium access control control element (MAC CE) configured for the terminal;
wherein the indicating the configured HARQ feedback enable rule of the Sidelink interface to the terminal through the MAC CE configured for the terminal comprises:
indicating the terminal to enable or not enable HARQ feedback of the Sidelink interface through a logic channel identification (LCD) value in a sub-header in the MAC CE configured for the terminal; or indicating the configured HARQ feedback enable rule of the Sidelink interface to the terminal through a specified content in the MAC CE configured for the terminal;
wherein the specified content in the MAC CE configured for the terminal comprises:
a radio bearer (RB) identification of the Sidelink interface for enabling or not enabling HARQ feedback; or a LCID of service data of the Sidelink interface for enabling or not enabling HARQ feedback; or a bitmap for indicating to enable or not enable HARQ feedback for a corresponding RB; or a data quality of service (QoS) threshold for enabling or not enabling HARQ feedback; or a physical layer channel quality threshold parameter for enabling or not enabling HARQ feedback; or a physical layer HARQ retransmission number count threshold for enabling or not enabling HARQ feedback.

5. The method according to claim 1, wherein the indicating the configured HARQ feedback enable rule of the Sidelink interface to the terminal comprises:
indicating the configured HARQ feedback enable rule of the Sidelink interface to the terminal through a PDCCH command for configuring Sidelink interface resources for the terminal.

6. The method according to claim 5, wherein
in response to the PDCCH command being a dynamic resource scheduling command, the configured HARQ feedback enable rule of the Sidelink interface is a HARQ feedback enable rule of the Sidelink interface used by currently dynamically scheduled Sidelink interface resources; and
in response to the PDCCH command being a periodic resource scheduling command, the configured HARQ feedback enable rule of the Sidelink interface is a HARQ feedback enable rule of the Sidelink interface used by periodically scheduled Sidelink interface resources.

7. The method according to claim 1, wherein the specified Sidelink interface resources are specified frequency resources, or specified bandwidth part (BWP) resources, or specified carrier resources; or
the method is applied to a base station or relay node or central unit (CU) or distributed unit (DU) in a base station unit, or a third party terminal for scheduling Sidelink transmissions between terminals to configure the HARQ feedback enable rule of the Sidelink interface for the terminal.

8. A method for determining hybrid automatic repeat request (HARQ) feedback configuration by a terminal, comprising:
receiving a configured HARQ feedback enable rule, indicated by a configuration node, of a Sidelink interface; and determining to enable or not enable HARQ feedback on the Sidelink interface according to the configured HARQ feedback enable rule of the Sidelink interface;

wherein the configured HARQ feedback enable rule of the Sidelink interface indicates any one or more of:

whether to enable HARQ feedback for specified Sidelink interface resources;

whether to enable HARQ feedback for terminals in a specified region;

whether to enable HARQ feedback for a specified bearer;

whether to enable HARQ feedback for a specified logical channel;

whether to enable HARQ feedback according to a quantity of data retransmissions of the Sidelink interface in a set period; and whether to enable HARQ feedback according to a scheduling transmission mechanism of the Sidelink interface, wherein whether to enable HARQ feedback according to the scheduling transmission mechanism of the Sidelink interface comprises: whether to enable HARQ feedback for a currently activated preconfigured resource in a scheduling command for activating the preconfigured resource, or, whether to enable HARQ feedback in a currently dynamic scheduling command.

9. The method according to claim 8, wherein the receiving the configured HARQ feedback enable rule, indicated by the configuration node, of the Sidelink interface, comprises:

determining the indicated configured HARQ feedback enable rule of the Sidelink interface by receiving a broadcast message from the configuration node for configuring Sidelink interface resources for the terminal; or determining the indicated configured HARQ feedback enable rule of the Sidelink interface by receiving dedicated RRC signaling from the configuration node for configuring Sidelink interface resources.

10. The method according to claim 9, wherein in a case of determining the indicated configured HARQ feedback enable rule of the Sidelink interface by receiving the dedicated RRC signaling from the configuration node for configuring Sidelink interface resources, the method further comprises:

receiving a physical downlink control channel (PDCCH) deactivation command sent by the configuration node, and determining to not enable the configured HARQ feedback enable rule; or receiving a PDCCH activation command sent by the configuration node, and determining to enable the configured HARQ feedback enable rule.

11. The method according to claim 8, wherein the configured HARQ feedback enable rule of the Sidelink interface is a HARQ feedback enable rule of the Sidelink interface used by the terminal when the terminal uses the configured Sidelink interface resources.

12. The method according to claim 8, wherein the receiving the configured HARQ feedback enable rule, indicated by the configuration node, of the Sidelink interface, comprises:

determining the indicated configured HARQ feedback enable rule of the Sidelink interface through a medium access control control element (MAC CE) configured by the configuration node;

wherein determining the indicated configured HARQ feedback enable rule of the Sidelink interface by receiving the MAC CE configured by the configuration node, comprises:

determining the indicated configured HARQ feedback enable rule of the Sidelink interface by a specified indication bit in a sub-header in the MAC CE configured by the configuration node; or determining the indicated configured HARQ feedback enable rule of the Sidelink interface through a specified content in the MAC CE configured by the configuration node.

13. The method according to claim 12, wherein the received specified indication bit in the sub-header in the MAC CE configured by the configuration node is configured to: indicate to not enable HARQ feedback through a fixed value, or to indicate to enable or not enable HARQ feedback through different indication values respectively;

wherein the specified content in the MAC CE configured by the configuration node comprises:

a radio bearer (RB) identification of the Sidelink interface for enabling or not enabling HARQ feedback; or a logic channel identification (LCD) of service data of the Sidelink interface for enabling or not enabling HARQ feedback; or a bitmap for indicating to enable or not enable HARQ feedback for a corresponding RB; or a data quality of service (QoS) threshold for enabling or not enabling HARQ feedback; or a physical layer channel quality threshold parameter for enabling or not enabling HARQ feedback; or a physical layer HARQ retransmission number count threshold for enabling or not enabling HARQ feedback.

14. The method according to claim 8, wherein the receiving the configured HARQ feedback enable rule, indicated by the configuration node, of the Sidelink interface, comprises:

determining the indicated configured HARQ feedback enable rule of the Sidelink interface by receiving a PDCCH command for Sidelink interface resources configured by the configuration node.

15. The method according to claim 14, wherein in response to the PDCCH command being a dynamic resource scheduling command, the configured HARQ feedback enable rule of the Sidelink interface is a HARQ feedback enable rule of the Sidelink interface used by currently dynamically scheduled Sidelink interface resources; and in response to the PDCCH command being a periodic resource scheduling command, the configured HARQ feedback enable rule of the Sidelink interface is a HARQ feedback enable rule of the Sidelink interface used by periodically scheduled Sidelink interface resources.

16. The method according to claim 8, wherein the specified Sidelink interface resources are specified frequency resources, or specified bandwidth part (BWP) resources, or specified carrier resources.

17. The method according to claim 8, wherein the configuration node is a base station or relay node or central unit (CU) or distributed unit (DU) in a base station unit, or a third party terminal for scheduling Sidelink transmissions between terminals; or after determining the terminal to enable or not enable HARQ feedback on the Sidelink interface according to the configured HARQ feedback enable rule of the Sidelink interface, the method further comprises:

notifying a peer terminal on the Sidelink interface to enable or not enable HARQ feedback on the Sidelink interface.

18. A device for determining hybrid automatic repeat request (HARQ) feedback configuration by a terminal, comprising a processor and a memory, wherein the processor is configured to read a program in the memory and execute:

receiving a configured HARQ feedback enable rule, indicated by a configuration node, of a Sidelink interface; and determining to enable or not enable HARQ feedback on the Sidelink interface according to the configured HARQ feedback enable rule of the Sidelink interface;

wherein the configured HARQ feedback enable rule of the Sidelink interface indicates any one or more of:

whether to enable HARQ feedback for specified Sidelink interface resources;

whether to enable HARQ feedback for terminals in a specified region;

whether to enable HARQ feedback for a specified bearer;

whether to enable HARQ feedback for a specified logical channel;

whether to enable HARQ feedback according to a quantity of data retransmissions of the Sidelink interface in a set period; and whether to enable HARQ feedback according to a scheduling transmission mechanism of the Sidelink interface, wherein whether to enable HARQ feedback according to the scheduling transmission mechanism of the Sidelink interface comprises: whether to enable HARQ feedback for a currently activated preconfigured resource in a scheduling command for activating the preconfigured resource, or, whether to enable HARQ feedback in a currently dynamic scheduling command.

* * * * *